United States Patent
Gopalakrishnan et al.

(10) Patent No.: US 12,169,669 B2
(45) Date of Patent: Dec. 17, 2024

(54) COMPUTER SYSTEM FOR SIMULATING PHYSICAL PROCESS USING LATTICE BOLTZMANN BASED SCALAR TRANSPORT ENFORCING GALILEAN INVARIANCE FOR SCALAR TRANSPORT

(71) Applicant: Dassault Systemes Americas Corp., Waltham, MA (US)

(72) Inventors: Pradeep Gopalakrishnan, Woburn, MA (US); Raoyang Zhang, Burlington, MA (US); Hudong Chen, Newton, MA (US); Avinash Jammalamadaka, Burlington, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 433 days.

(21) Appl. No.: 16/987,820

(22) Filed: Aug. 7, 2020

(65) Prior Publication Data

US 2021/0133374 A1   May 6, 2021

Related U.S. Application Data

(60) Provisional application No. 62/927,828, filed on Oct. 30, 2019.

(51) Int. Cl.
*G06F 30/25* (2020.01)
*G06F 111/10* (2020.01)

(52) U.S. Cl.
CPC .......... *G06F 30/25* (2020.01); *G06F 2111/10* (2020.01)

(58) Field of Classification Search
CPC ...... G06F 30/25; G06F 2111/10; G06F 30/28; G06F 2113/08; G06F 2119/10; G06F 2119/14; G06F 30/20; G06F 30/23
See application file for complete search history.

(56) References Cited

U.S. PATENT DOCUMENTS

| | | |
|---|---|---|
| 5,377,129 A | 12/1994 | Molvig |
| 5,548,694 A | 8/1996 | Gibson |

(Continued)

FOREIGN PATENT DOCUMENTS

| | | |
|---|---|---|
| EP | 3528146 | 8/2019 |
| JP | 2010-500654 | 1/2010 |
| WO | WO 2013/085567 | 6/2013 |

OTHER PUBLICATIONS

Zhang, Raoyang, Hongli Fan, and Hudong Chen. "A lattice Boltzmann approach for solving scalar transport equations." Philosophical Transactions of the Royal Society A: Mathematical, Physical and Engineering Sciences 369.1944 (2011): 2264-2273. (Year: 2011).*

(Continued)

*Primary Examiner* — Michael Edward Cocchi
(74) *Attorney, Agent, or Firm* — Fish & Richardson P.C.

(57) ABSTRACT

Disclosed are techniques for scalar solvers in flow simulations that include simulating using a scalar lattice velocity set in a computing system, movement of scalar particles representing a scalar quantity in a volume of fluid, with the scalar particles carried by flow particles of the volume of fluid, and with the movement of the scalar particles causing collisions among the scalar particles; and evaluating, a non-equilibrium post-collide scalar distribution function of a specified order that is representative of the scalar collision.

21 Claims, 10 Drawing Sheets

(56) References Cited

U.S. PATENT DOCUMENTS

| | | | |
|---|---|---|---|
| 5,594,671 | A | 1/1997 | Chen et al. |
| 5,606,517 | A | 2/1997 | Traub et al. |
| 5,640,335 | A | 6/1997 | Molvig |
| 5,848,260 | A | 12/1998 | Chen et al. |
| 5,910,902 | A | 6/1999 | Molvig et al. |
| 5,953,239 | A | 9/1999 | Teixeira et al. |
| 6,089,744 | A | 7/2000 | Chen et al. |
| 6,915,245 | B1 | 7/2005 | Hinton |
| 7,277,795 | B2 | 10/2007 | Boitnott |
| 7,558,714 | B2 | 7/2009 | Shan et al. |
| 7,920,996 | B2 | 4/2011 | Harada |
| 8,099,265 | B2 | 1/2012 | Houston |
| 8,224,633 | B2 | 7/2012 | Shan |
| 8,296,112 | B2 | 10/2012 | Tanaka |
| 8,452,576 | B2 | 5/2013 | Reich |
| 8,688,414 | B2 | 4/2014 | Bornoff et al. |
| 8,775,139 | B2 | 7/2014 | Shim |
| 8,775,140 | B2 | 7/2014 | Yu |
| 8,970,592 | B1 | 3/2015 | Petterson |
| 9,576,087 | B2 | 2/2017 | Chen et al. |
| 10,360,324 | B2 | 7/2019 | Chen et al. |
| 2003/0060988 | A1 | 3/2003 | Ginzburg |
| 2008/0126045 | A1 | 5/2008 | Shan et al. |
| 2010/0030534 | A1 | 2/2010 | Reich et al. |
| 2010/0185420 | A1 | 7/2010 | Ding |
| 2010/0300942 | A1 | 12/2010 | Sulchek |
| 2011/0238394 | A1 | 9/2011 | Shin |
| 2011/0307837 | A1 | 12/2011 | Cohen |
| 2012/0265511 | A1 | 10/2012 | Shan |
| 2012/0296615 | A1 | 11/2012 | Shim |
| 2013/0116997 | A1 | 5/2013 | Sun et al. |
| 2013/0151221 | A1 | 6/2013 | Chen et al. |
| 2014/0136159 | A1 | 5/2014 | Chen |
| 2014/0343858 | A1 | 11/2014 | Crouse |
| 2015/0356217 | A1* | 12/2015 | Chen ............... G06F 30/20 703/2 |
| 2017/0124232 | A1 | 5/2017 | Chen et al. |
| 2020/0019662 | A1 | 1/2020 | Chen et al. |

OTHER PUBLICATIONS

Kupershtokh, Alexander L., Dmitry A. Medvedev, and Igor I. Gribanov. "Thermal lattice Boltzmann method for multiphase flows." Physical Review E 98.2 (2018): 023308. (Year: 2018).*

Johnson, Andrew A., and Tayfun E. Tezduyar. "3D simulation of fluid-particle interactions with the number of particles reaching 100." Computer Methods in Applied Mechanics and Engineering 145.3-4 (1997): 301-321. (Year: 1997).*

Kandhai, D., et al. "Lattice-Boltzmann and finite element simulations of fluid flow in a SMRX Static Mixer Reactor." International journal for numerical methods in fluids 31.6 (1999): 1019-1033. (Year: 1999).*

Mattila, Keijo K., Paulo C. Philippi, and Luiz A. Hegele. "High-order regularization in lattice-Boltzmann equations." Physics of Fluids 29.4 (2017). (Year: 2017).*

Greenshields, Christopher J., and Jason M. Reese. "Rarefied hypersonic flow simulations using the Navier-Stokes equations with non-equilibrium boundary conditions." Progress in Aerospace Sciences 52 (2012): 80-87. (Year: 2012).*

Allahyarov et al, "Mesoscopic Solvent Simulations: Multiparticle-Collision Dynamics of Three-Dimensinal Flows," Physical Review E, Sep. 2002, 66(3):036702, 9 pages.

Bao et al., "Lattice Boltzmann Method for Fluid Simulations," New York University—Courant Institute of Mathematical Sciences, Apr. 14, 2011, 16 pages.

Chen et al., "Lattice Boltzmann Method for Fluid Flows", Annu. Rev. Fluid Mechanichs, Jan. 1998. 30:329-364.

Geier et al., "Cascaded digital lattice Boltzmann automata for high Reynolds number flow," The American Physical Society, 2006, 10 pages.

Guo et al., "Discrete lattice effects on the forcing term in the lattice Boltzmann method," The American Physical Society, 2002, 5 pages.

Inamuro et al, "A Galilean invariant model of the lattice Boltzmann method for multiphase fluid flows using free-energy approach," Computer Physics Communications, Jul. 2000, 129(1-3):32-45.

Joshi et al, "Lattice Boltzmann Method for Multi-Component, Non-Continuum Mass Diffusion," J. Phys. D: Appl. Physics, Dec. 7, 2007, 40(23):7593-7600.

Larina et al., "Nonlinear Nonequilibrium Kinetic Model of the Boltzmann Equation for Monotonic Gases," Computational Mathematics and Mathematical Physics, Nov. 2011, 51(11):1962-1972.

Nie et al., "Galilean invariance of lattice Boltzmann models", Europhysics Letters, Jan. 2008, 81(3):34005, 6 pages.

Parmigiani, "Lattice Boltzmann calculations of reactive multiphase flows in porous media," Thesis for the degree of Doctor of Science, University of Geneva, 2011, 138 pages.

EP Extended European Search Report in European Appln. No. 20204052.3, dated Mar. 5, 2021, 8 pages.

Lew et al., "Noise Prediction of a Subsonic Turbulent Round Jet using the Lattice-Boltzmann Method", 13th AIAA/CEAS Aeroacoustics Conference (28th AIAA Aeroacoustics Conference), May 2007, 23 pages.

* cited by examiner

COMPUTER SYSTEM FOR SIMULATING PHYSICAL PROCESS USING LATTICE BOLTZMANN BASED SCALAR TRANSPORT ENFORCING GALILEAN INVARIANCE FOR SCALAR TRANSPORT

CLAIM OF PRIORITY

This application claims priority under 35 USC § 119(e) to U.S. Provisional Patent Application Ser. No. 62/927,828, filed on Oct. 30, 2019, and entitled "Galilean Invariant Lattice Boltzmann Collision Formulation for Scalar Transport in High Speed Flow Simulations," the entire contents of which are hereby incorporated by reference.

BACKGROUND

This description relates to computer simulation of physical processes, such as physical fluid flows.

High Reynolds number flow has been simulated by generating discretized solutions of the Navier-Stokes differential equations by performing high-precision floating point arithmetic operations at each of many discrete spatial locations on variables representing the macroscopic physical quantities (e.g., density, temperature, flow velocity). Another approach replaces the differential equations with what is generally known as lattice gas (or cellular) automata, in which the macroscopic-level simulation provided by solving the Navier-Stokes equations is replaced by a microscopic-level model that performs operations on particles moving between sites on a lattice.

The Lattice Boltzmann Method (LBM) has been used for a wide range of industrial applications involving complex geometries. However, in some instances LBM is often limited to low Mach number flows (or Mach flows), e.g., in applications involving low speed flows (of about Mach numbers<0.3). The existing LBM approach for solving scalars such as energy or scalar concentration in multi-species flows, use finite difference-based solvers. These finite difference-based solvers take away many of the advantages of the LBM approach, such as localized computation, high scalability and grid independent solutions.

SUMMARY

Discussed below are techniques that can overcome many of the above fundamental limitations of LBM for high speed flows, and thus allow the use of LBM for simulation of a wide range of applications involving not only low speed flows (e.g., <0.3 Mach number) but high-speed flows as well such as, e.g., >0.3 Mach number, and supersonic flows (e.g., Mach>1.0 and hypersonic or at least multiples of Mach numbers).

Instead of using finite difference approaches, the techniques discussed below use additional distribution function(s) and scalar solver(s) for scalar(s). The use of scalar solvers maintains those advantages of the LBM technique that are otherwise lost with the use of finite difference-based solvers. These distribution functions are strongly coupled with flow distribution, i.e., these functions are carried by the flow particles along the lattice directions.

According to an aspect, a computer implemented method includes simulating by a computing system using a scalar lattice velocity set, movement of scalar particles representing a scalar quantity in a volume of fluid, with the scalar particles carried by flow particles of the volume of fluid, and with the movement of the scalar particles causing collisions among the scalar particles and evaluating, a non-equilibrium post-collide scalar distribution function of a specified order that is representative of the scalar collision.

The following are some of the features among other features as disclosed herein, within the scope of the above aspect.

The non-equilibrium post-collide scalar distribution function is Galilean invariant. The non-equilibrium post-collide scalar distribution function is related to relative velocity of the flow particles in the volume of fluid. The movement of the scalar particles causing collisions among the scalar particles results in a diffusion of scalar quantity through the volume.

The method further includes simulating by the computing system using a flow lattice velocity set, movement of flow particles representing the volume of fluid, with the movement of the flow particles causing collisions among the flow particles and evaluating, a non-equilibrium post-collide flow distribution function of a specified order that is representative of the flow collision.

The scalar lattice velocity set, the scalar quantity and the non-equilibrium post-collide scalar distribution function are respectively a first scalar lattice velocity set, a first scalar quantity, and a first non-equilibrium post-collide scalar distribution function, and the method further includes simulating, in the computer using a second, different scalar lattice velocity set, movement of second scalar particles representing a second, different scalar quantity in the volume of fluid, with the second scalar particles carried by the flow particles in the volume of fluid, and with the movement of the second scalar particles causing collisions among the second scalar particles; and based on the movement of the second scalar particles and evaluating, a second, different non-equilibrium post-collide scalar distribution function of a specified order that is representative of the second scalar collision.

The non-equilibrium post-collide scalar distribution function retains non-equilibrium moments for the scalar quantity, and eliminates non-equilibrium moments for the scalar quantity higher than the specified order. The scalar lattice velocity set supports hydrodynamic movements up to a specified order of a scalar particle speed. The specified order is an exponential value associated with a ratio of the fluid velocity to lattice sound speed and the lattice velocity set supports the exponential value. The specified order is selected from the zeroth order, the first order, and the second order.

The method further includes determining using the flow lattice velocity set, relative particle velocities of particle at particular locations within the volume of fluid, with the relative particle velocities being differences between absolute velocities of the particles at the particular locations measured under zero flow of the fluid in the volume and a mean velocity of the particles at the particular location within the volume and determining, based on the relative particle velocity, a non-equilibrium post-collide distribution of a specified order that is representative of the collision of the particles.

For fluid flows of a macroscopic regime the specified order is a first order moment proportional to the gradient of the scalar. The non-equilibrium post-collide scalar distribution is proportional to a summation over the scalar lattice velocity set of the Hermite polynomial divided by a factorial of the order times a non-dimensional velocity of the fluid.

The non-equilibrium post-collide scalar distribution is related to the summation multiplied by a weight factor corresponding to weighting factor of particle distribution function.

According to an additional aspect, a computer system includes one or more processors and memory operatively coupled to the one or more processors, a computer storage device that stores instructions to cause the one or more processors to simulate using a scalar lattice velocity set, movement of scalar particles representing a scalar quantity in a volume of fluid, with the scalar particles carried by flow particles of the volume of fluid, and with the movement of the scalar particles causing collisions among the scalar particles, and evaluate, a non-equilibrium post-collide scalar distribution function of a specified order that is representative of the scalar collision.

The non-equilibrium post-collide scalar distribution function is Galilean invariant. The non-equilibrium post-collide scalar distribution function is related to relative velocity of the flow particles in the volume of fluid. The movement of the scalar particles causing collisions among the scalar particles results in a diffusion of scalar quantity through the volume.

The computer system further includes instructions to simulate using a flow lattice velocity set, movement of flow particles representing the volume of fluid, with the movement of the flow particles causing collisions among the flow particles, and evaluate a non-equilibrium post-collide flow distribution function of a specified order that is representative of the flow collision.

The scalar lattice velocity set, the scalar quantity and the non-equilibrium post-collide scalar distribution function are respectively a first scalar lattice velocity set, a first scalar quantity, and a first non-equilibrium post-collide scalar distribution function, and the computer system further includes instructions to simulate, in the computer using a second, different scalar lattice velocity set, movement of second scalar particles representing a second, different scalar quantity in the volume of fluid, with the second scalar particles carried by the flow particles in the volume of fluid, and with the movement of the second scalar particles causing collisions among the second scalar particles, and based on the movement of the second scalar particles, evaluate a second, different non-equilibrium post-collide scalar distribution function of a specified order that is representative of the second scalar collision.

The following are some of the features among other features as disclosed herein, within the scope of the above aspect.

According to an additional aspect, a computer program product stored on an non-transitory computer readable medium including instructions for causing a system comprising one or more processors and memory storing a program to simulate using a scalar lattice velocity set, movement of scalar particles representing a scalar quantity in a volume of fluid, with the scalar particles carried by flow particles of the volume of fluid, and with the movement of the scalar particles causing collisions among the scalar particles, and evaluate, a non-equilibrium post-collide scalar distribution function of a specified order that is representative of the scalar collision.

The following are some of the features among other features as disclosed herein, within the scope of the above aspect.

The non-equilibrium post-collide scalar distribution function is Galilean invariant. The non-equilibrium post-collide scalar distribution function is related to relative velocity of the flow particles in the volume of fluid.

The movement of the scalar particles causing collisions among the scalar particles results in a diffusion of scalar quantity through the volume. The computer program product further includes instructions to simulate using a flow lattice velocity set, movement of flow particles representing the volume of fluid, with the movement of the flow particles causing collisions among the flow particles, and evaluate a non-equilibrium post-collide flow distribution function of a specified order that is representative of the flow collision.

The scalar lattice velocity set, the scalar quantity and the non-equilibrium post-collide scalar distribution function are respectively a first scalar lattice velocity set, a first scalar quantity, and a first non-equilibrium post-collide scalar distribution function, and the computer system further includes instructions to simulate, in the computer using a second, different scalar lattice velocity set, movement of second scalar particles representing a second, different scalar quantity in the volume of fluid, with the second scalar particles carried by the flow particles in the volume of fluid, and with the movement of the second scalar particles causing collisions among the second scalar particles; and based on the movement of the second scalar particles, evaluate a second, different non-equilibrium post-collide scalar distribution function of a specified order that is representative of the second scalar collision.

One or more of the aspects may include one or more of the following advantages.

The techniques disclosed herein can be used in complex fluid flow simulations to concurrently solve scalar quantities such as temperature distribution, concentration distribution, and/or density in conjunction with solving for fluid flow. In the systems and methods described herein, modeling of the scalar quantities (as opposed to vector quantities) is coupled with the modeling of the fluid flow based on a LBM-based physical process simulation system. Exemplary scalar quantities that can be simulated include temperature, concentration, and density.

Other features and advantages will be apparent from the following description, including the drawings, and the claims.

DETAILED DESCRIPTION

General Approach to Solving Scalar Quantities

Figure 1:
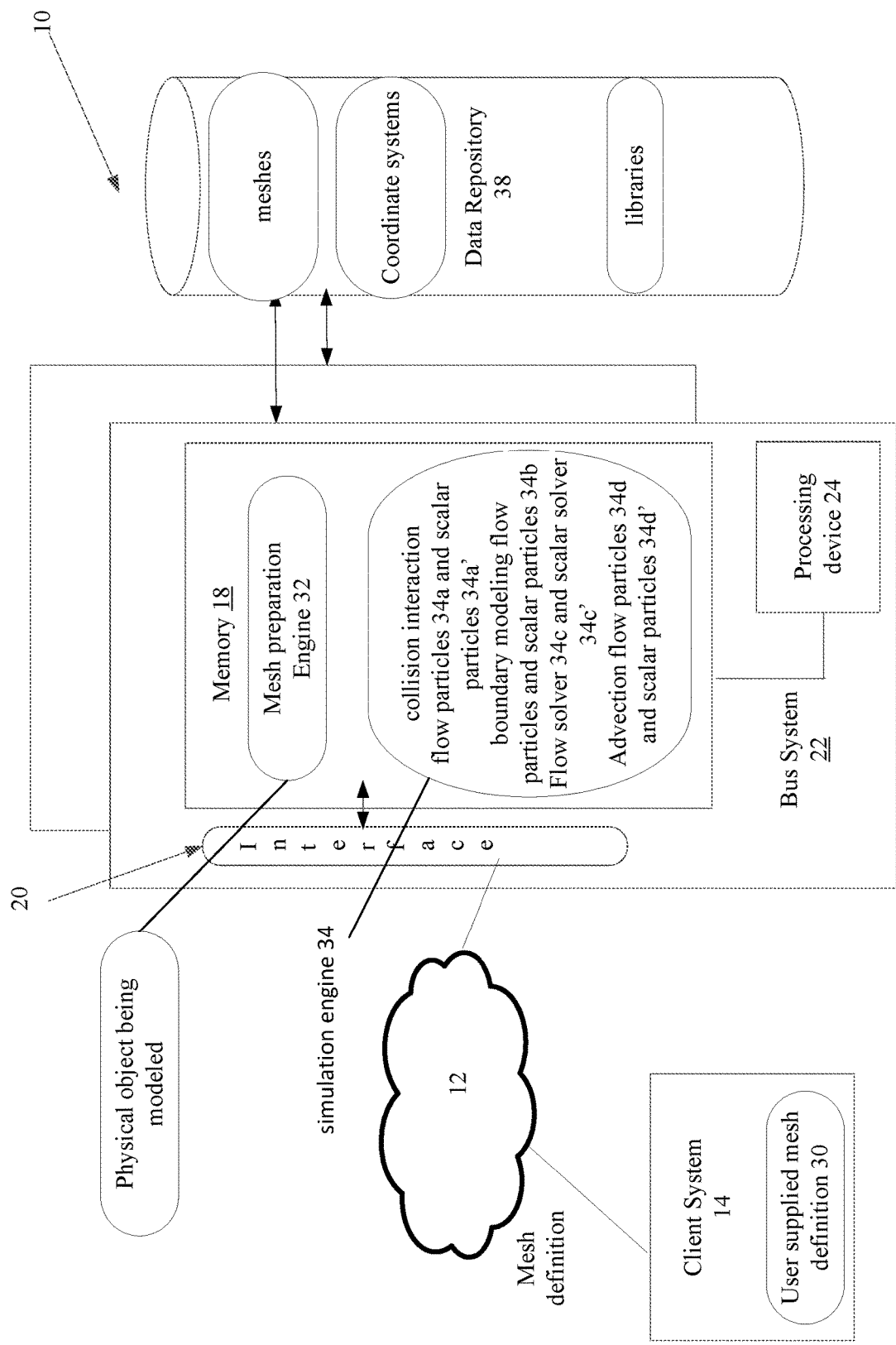
FIG. 1 depicts a system for simulation of fluid flows, which includes a scalar solver.

In the systems and methods described herein, modeling of scalar quantities (as opposed to vector quantities) is coupled with the modeling of a fluid flow using a LBM-based physical process simulation system. Exemplary scalar quantities that can be simulated include temperature, concentration, and density.

An automated process, for a fluid flow simulation is performed by a simulation engine 34, for example, as described in U.S. patent application Ser. No. 11/463,673, entitled Computer Simulation of Physical Process (now issued as U.S. Pat. No. 7,558,714) incorporated herein in its entirety by reference. However, this simulation engine also includes a scalar solver for solving for scalar quantities such as temperature, concentration and density.

In the procedure discussed in FIG. 9 below, a flow simulation process is described using the flow solver and the scalar solver for collision transport. In FIGS. 7, 8 and 10-16 those figures are labeled "prior art." These figures are labeled prior art because these figures generally appear in the herein referenced patents. However, these figures, as they appear in the referenced patents, do not take into consideration any modifications that would be made to a flow simulation using the scalar solver approach described below, because such scalar solver approach is not described in the referenced patents.

1. Model Simulation Space

In a LBM-based physical process simulation system, fluid flow is represented by the distribution function values $f_i$, evaluated at a set of discrete velocities $c_i$. The dynamics of the distribution function is governed by the equation below, where $f_i^{eq}$ is known as the equilibrium distribution function, defined as:

$$f_i(x + c_i, t + \delta t) = f_i(x, t) - \frac{1}{\tau}(f_i(x, t) - f_i^{eq})  \qquad \text{Eq. (I-1)}$$

where $f_i^{eq}$ is known as the equilibrium distribution function defined in Eq.(1.3) below. This equation is the well-known lattice Boltzmann equation that describes the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision factor," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass $\rho$ and fluid velocity $u$, are obtained as simple summations. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring now to FIG. 1, a system 10 that includes a flow solver 34*c* and a scalar solver 34*c'* for high-speed flows is described. The system 10 in this implementation is based on a client-server or cloud-based architecture and includes a server system 12 implemented as a massively parallel computing system 12 (stand alone or cloud-based) and a client system 14. The server system 12 includes memory 18, a bus system 22, interfaces 20 (e.g., user interfaces/network interfaces/display or monitor interfaces, etc.) and a processing device 24. In memory 18 are a mesh preparation engine 32 and a simulation engine 34.

While FIG. 1 shows the mesh preparation engine 32 in memory 18, the mesh preparation engine can be a third-party application that is executed on a different system than server 12. Whether the mesh preparation engine 32 executes in memory 18 or is executed on a different system than server 12, the mesh preparation engine 32 receives a user-supplied mesh definition 30, and the mesh preparation engine 32 prepares a mesh and sends (and or stores) the prepared mesh to the simulation engine 34 according to a physical object that is being modeled for simulation by the simulation engine 34. The system 10 accesses a data repository 38 that stores 2D and/or 3D meshes (Cartesian and/or curvilinear), coordinate systems, and libraries.

The simulation engine includes a collision interaction module 34*a* for flow particles and a collision interaction module 34*a'* for scalar particles, a boundary module 34*b* and the simulation engine 34 evaluates a flow solver 34*c* for fluid particle collision transport and a scalar solver 34*c'* for scalar particle transport. The simulation engine 34 also includes an advection flow collision interaction module 34*d* and an advection scalar particle collision interaction module 34*d'* that advance flow particles along with the scalar particles to next cells in the mesh.

Figures 5, 6:
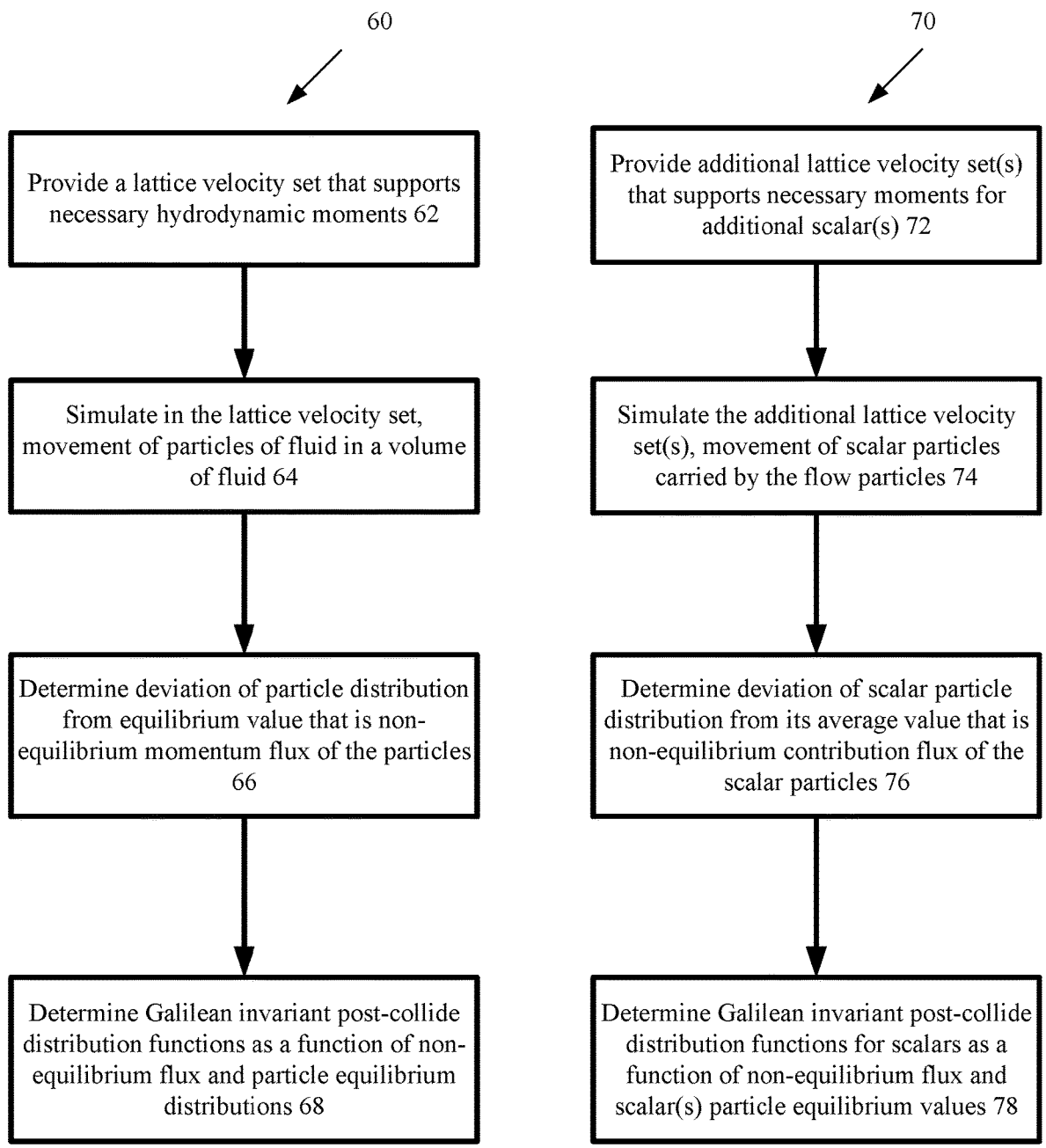
FIG. 5 is a flow chart of a process for generating a distribution function for collision transport.
FIG. 6 is a flow chart of a process for generating a scalar solver that can be used in various high-speed fluid simulation applications.

A discussion of the flow solver 34*c* is set out in the above-mentioned patent, as well as in FIG. 5. A discussion of the scalar solver 34*c'* is set out below and in FIG. 6.

Figure 2:
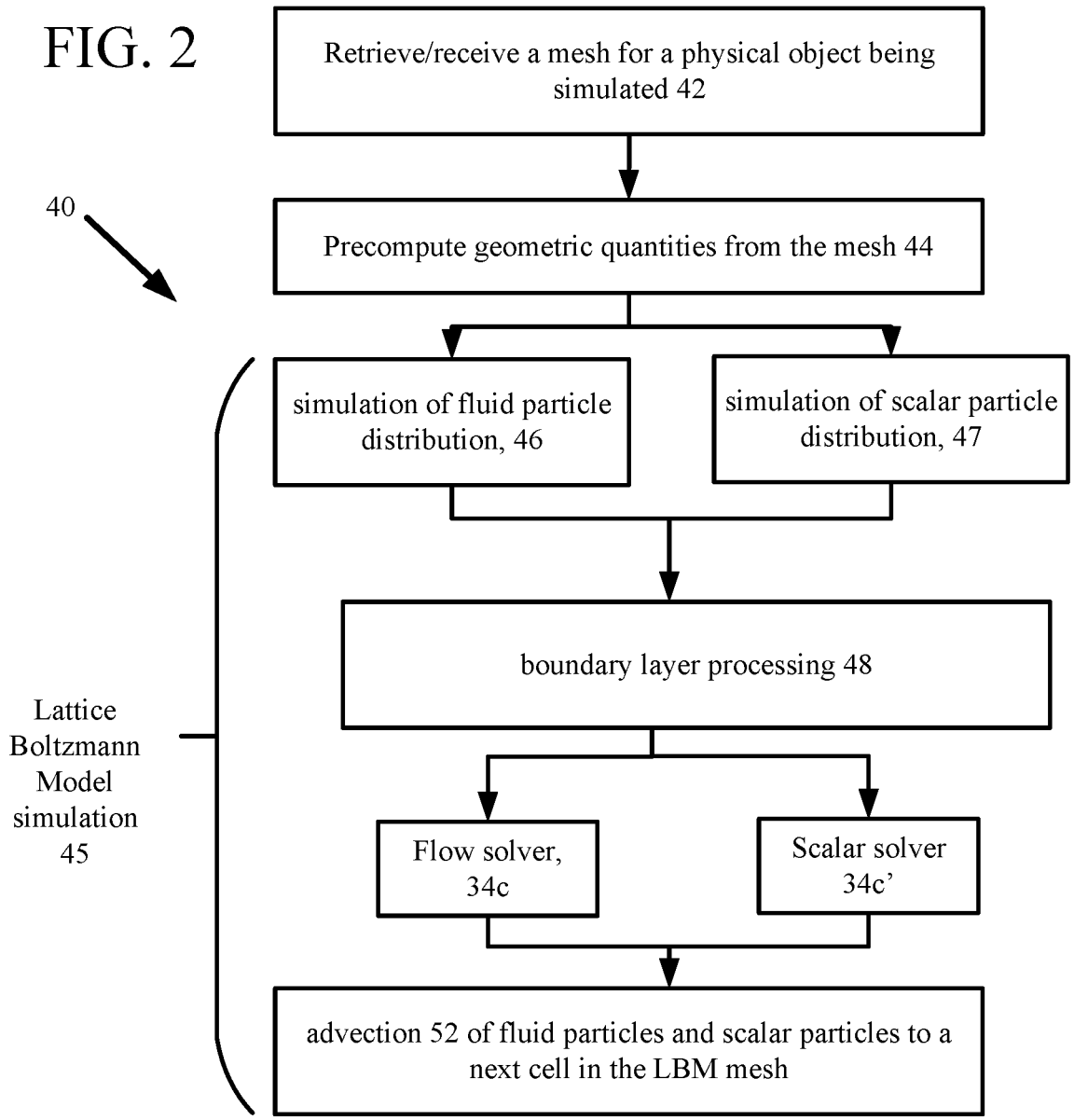
FIG. 2 depicts a flow chart showing operations for formulation of a Lattice Boltzmann Model simulation with the scalar solver.

Referring now to FIG. 2, a process 40 for simulating fluid flow about a representation of a physical object is shown. In the example that will be discussed herein, the physical object is an airfoil. The use of an airfoil is merely illustrative, however, as the physical object can be of any shape, and in particular can have planar and/or curved surface(s). The process 40 receives 42, e.g., from client system 14 or retrieves from the data repository 38, a mesh (or grid) for the physical object being simulated, e.g., the airfoil. In other embodiments, either an external system or the server 12 based on user input, generates the mesh for the physical object being simulated.

The process 40 receives 42, e.g., from client system 14 or retrieves from the data repository 38, a three-dimensional representation for the airfoil. The process precomputes 44 geometric quantities from the retrieved mesh and performs dynamic Lattice Boltzmann Model simulation 45 using the precomputed geometric quantities corresponding to the retrieved mesh. Lattice Boltzmann Model simulation 45 includes the simulation evolution of particle flow distribution 46 and performing boundary layer processing 48 when the flows impact a physical surface. The movement of the flow particles causes collisions among the flow particles that are used in the flow solver 34c.

Process 40 also simulates 47 one or more additional scalar particle distributions using a scalar lattice velocity set and performs the boundary layer processing 48 of the scalar particles when the flows that carry the scalar particles impact a physical surface, as discussed above. These scalar particles represent movement of a scalar quantity in the volume of fluid, which scalar quantity is carried by the flow of the particles of the volume of fluid. The movement of the scalar particles causes collisions among the scalar particles that are used in the scalar solver 34c'. The process performs the advection 52 of flow particles and the scalar particles to a next cell in the LBM mesh.

Figure 3:
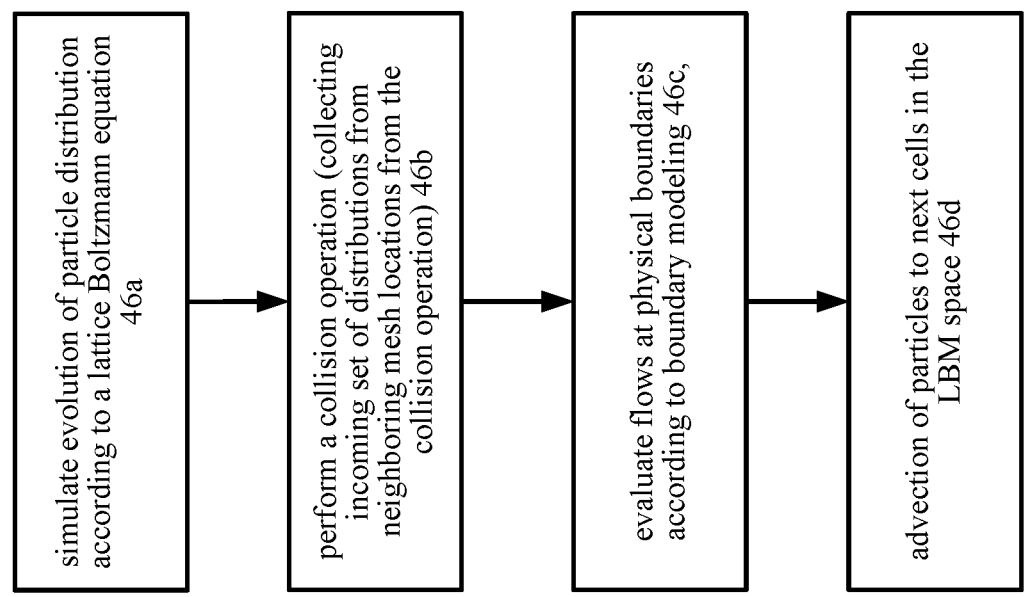
FIG. 3 depicts a flow chart showing simulation operations using the Lattice Boltzmann model.

Referring now to FIG. 3, the Lattice Boltzmann simulation process 46 simulates 46a evolution of flow particle distribution according to a lattice Boltzmann equation (LBE). The process 46 (see FIG. 2) performs a collision operation 46b (and collecting an incoming set of distributions from neighboring mesh locations from the collision operation), evaluates 46c flows at physical boundaries according to boundary modeling, and an advection 46d of particles to next cells in the LBM space. Details of LB collision solver 34c are set out in U.S. Pat. No. 9,576,087 (which is incorporated by reference in its entirety), as well as in portions of the discussion below.

Figure 4:
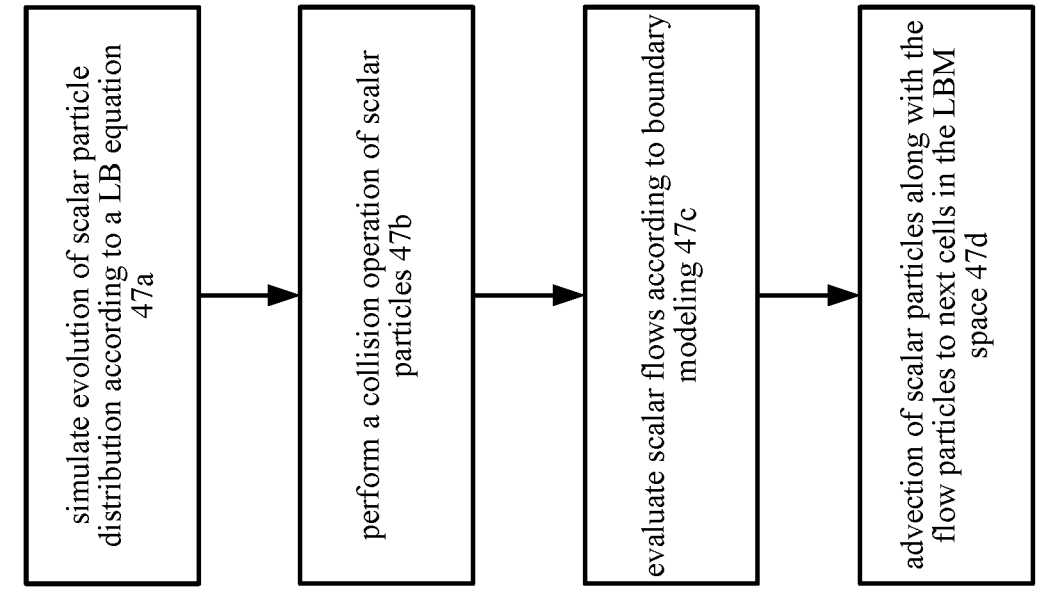
FIG. 4 depicts a flow chart showing simulation operations using the scalar solver.

Referring to FIG. 4, the Lattice Boltzmann simulation process 45 also includes a scalar particle distribution 47 according to a lattice Boltzmann equation (LBE). The LB scalar distribution is executed in parallel with the flow distribution 45a-45c of the simulation 45. The LB scalar solver portion 47 simulates 47a evolution of scalar particle distribution according to a lattice Boltzmann equation (LBE), performs a collision operation 47b (collecting an incoming set of distributions from neighboring mesh locations from the collision operation), evaluates 47c flows at physical boundaries according to boundary modeling, using the scalar solver 34c', and performs an advection 47d of scalar particles to next cells in the LBM space.

Details of the Lattice Boltzmann scalar solver (LB scalar solver or simply scalar solver) are set out below and in FIG. 6.

Consider that the time evaluation of the flow distribution and scalar distribution functions are given by, respectively:

$$f_i(x+c_i,t+dt)=f'_i(x,t)=f_i(x,t)=f_i(x,t)+\Omega_{fi}[f_i(x,t),f_i^{eq}(x,t)]$$ Eq.(1.1)

$$(f_i q_i)(x+c_i,t+dt)=f'_i q'_i(x,t)=f_i q_i(x,t)+\Omega_{qi}[f_i(x,t),f_i^{eq}(x,t),q_i(x,t),q_i^{eq}(x,t)]$$ Eq.(1.2)

where in equation Eq.(1.2) q—represents a specific scalar solver. Equation Eq.(1.2) thus is derived from equation Eq.(1.1), with terms in equation Eq.(1.2) that are a function of, q. Further, i is an index number of lattice velocities in the set; $c_i$ is the lattice velocity; x is the particular location within the volume; t is a particular point in time; dt is the time increment; $f_i^{eq}$ is the equilibrium distribution of particles; $q_i^{eq}$ is the equilibrium distribution of scalar; $f_i$ is the actual particle distribution of the flow; $q_i$ is the actual amount of scalar distribution; $f'_i$ is referred as post collide distribution of particles; $q'_i$ is referred as post collide distribution of scalar; $\Omega_{fi}$ represents the collision of fluid particles, and a specific form thereof is discussed below; and $\Omega_{qi}$ represents the collision of scalar particles and its specific form is discussed below.

As given by Eq.(1.2) the scalar distribution is multiplied by the flow distribution, which can be visualized as a scalar quantity being carried along with the flow particles. The total scalar quantity (specific scalar multiplied by density) is given by $(\rho q)=\Sigma_i(f_i q_i)$. The equilibrium particle density distribution in terms of the Hermite polynomials is given by $$f_i^{eq}(x,t) = \rho(x,t)w_i \sum_{n=0}^{\infty} \frac{\mathcal{H}^n(\varepsilon_i)}{n!} u(x,t)^n$$ Eq. (1.3)

where $\varepsilon_i=c_i/T_0^{1/2}$ is the non-dimensional lattice velocity; $u=V/T_0^{1/2}$ is the non-dimensional fluid velocity; $T_0^{1/2}$ is the temperature constant specific to the lattice set used; $\mathcal{H}^n(\varepsilon_i)$ is the $N t^h$ order Hermite polynomial; $\rho$ is the density of fluid; and $w_i$ is a lattice weight factor.

The equilibrium distribution for scalar value is simply its average value at the location at a given time is given as:

$$q_i^{eq}(x,t)=q(x,t).$$ Eq.(1.4)

2. Collision Process

The collision process is one of the two fundamental processes in the molecular dynamics, the other process being advection. The stability of an LBM solver relies upon the collision method employed. The collision process in the LBM serves the same purpose as that of collision of molecules in a real fluid system. The collision process obeys fundamental physics requirements, such as conservation of mass and momentum. In the case of a scalar solver, the scalar solver has to conserve the scalar concentration. The above quantities, such as velocity, density and scalar concentration are computed by taking the moments of the distribution functions (summation of distribution functions multiplied by the lattice velocities).

$$\rho(x,t) = \sum_i f_i(x,t); \quad (\rho u)(x,t) = \sum_i \varepsilon_i f_i(x,t);$$ Eq. (2.1)

$$(\rho q)(x,t) = \sum_i f_i(x,t) q_i(x,t)$$ Eq. (2.2)

wherein i is an index number of lattice velocities in the set; x is the particular location within the volume; $f_i$ is the actual particle distribution of the flow; $q_i$ is the actual amount of scalar distribution; t is a particular point in time; $\rho$ is the density of fluid; u is the velocity of the flow; and q is the scalar concentration.

The collision process is extremely complex and highly non-linear. A simple collision operator, the so called the BGK collision, expresses collision in a linear form as:

$$\Omega_{fi} = \left(1 - \frac{1}{\tau}\right)(f_i - f_i^{eq})$$ Eq. (2.3)

-continued $$\Omega_{qi} = \left(1 - \frac{1}{\tau_q}\right)(f_i q_i - f_i^{eq} q_i^{eq})$$

where i is an index number of lattice velocities in the set; $f_i^{eq}$ is the equilibrium distribution of particles; $q_i^{eq}$ is the equilibrium distribution of scalar; $f_i$ is the actual particle distribution of the flow; $q_i$ is the actual amount of scalar distribution; $\Omega_{fi}$ represents the collision of particles; $\Omega_{qi}$ represents the collision of scalar; $\tau$ is relaxation time for flow; and $\tau_q$ is relaxation time for scalar.

The selection of the relaxation time depends on the real physical properties of the fluid. For a flow solver 34c, the value of the relaxation time $\tau$ is a function of fluid viscosity $$\tau = \frac{v}{T_0} + 0.5 \qquad \text{Eq. (2.4)}$$

and for scalar particles the relaxation time, $\tau_q$, depends on its diffusivity, $$\tau_q = \frac{K}{T_0} + 0.5 \qquad \text{Eq. (2.5)}$$

where $\tau$ is relaxation time for flow; $\tau_q$ is relaxation time for scalar; $T_0$ is the temperature constant of the lattice set used; $v$ is the kinematic viscosity of the flow; $K$ is the diffusivity of the scalar.

The moments of the equilibrium distribution functions, Eq.(1.3) and Eq.(1.4), related to conserved quantities, are identical to the moments of the actual distributions as defined by Eq.(2.1) and Eq.(2.2), respectively. Thus, the BGK collision form satisfies all necessary physical constraints, the conservation of mass, momentum and scalar concentration.

$$\sum_i \Omega_{fi} = \left(1 - \frac{1}{\tau}\right)\sum_i (f_i - f_i^{eq}) = 0 \qquad \text{Eq. (2.6)}$$

$$\sum_i \varepsilon_i \Omega_{fi} = \left(1 - \frac{1}{\tau}\right)\sum_i \varepsilon_i (f_i - f_i^{eq}) = 0$$

$$\sum_i \Omega_{qi} = \left(1 - \frac{1}{\tau_q}\right)\sum_i (f_i q_i - f_i^{eq} q_i^{eq}) = 0$$

Any collision operator used needs to satisfy above constraints to simulate real physical phenomena.

3. Regularized Collision Operator

In addition to the moments discussed earlier, the following higher order moments related to momentum flux and scalar flux are of equal importance.

$$\pi^{eq}(x, t) = \sum_i \varepsilon_i \varepsilon_i f_i^{eq}(x, t) = (\rho u u + I p)(x, t) \qquad \text{Eq. (3.1)}$$

$$\varphi^{eq}(x, t) = \sum_i \varepsilon_i f_i^{eq}(x, t) q_i^{eq}(x, t) = (\rho u q)(x, t) \qquad \text{Eq. (3.2)}$$

where $\varepsilon_i$ is the non-dimensional velocity; i is an index number of lattice velocities in the set; x is the particular location within the volume; t is a particular point in time; $\pi^{eq}(x, t)$ is the momentum flux of the equilibrium distribution function; $\varphi^{eq}(x, t)$ is the scalar flux of the equilibrium distribution function; $f_i^{eq}$ is the equilibrium distribution of particles; $q_i^{eq}$ is the equilibrium distribution of scalar; u is the non-dimensional fluid velocity; p is the pressure of the fluid.

Similarly, the higher order moments for the actual particle distribution function and scalar distribution function is given by:

$$\pi(x, t) = \sum_i \varepsilon_i \varepsilon_i f_i(x, t) \qquad \text{Eq. (3.3)}$$

$$\varphi(x, t) = \sum_i \varepsilon_i f_i(x, t) q_i(x, t) \qquad \text{Eq. (3.4)}$$

where $\pi$ is the actual momentum flux; and $\varphi$ is the actual scalar flux. These moments $\pi(x, t)$ and $\varphi(x, t)$ can be split into two; one moment due to equilibrium contribution given by Eq.(3.1) and Eq.(3.2) and another moment due to non-equilibrium flux contributions. The non-equilibrium flux contributions arise due to the deviation of actual distribution functions from its equilibrium counterpart.

$$\pi^{neq}(x, t) = \sum_i \varepsilon_i \varepsilon_i (f_i(x, t) - f_i^{eq}(x, t)) \qquad \text{Eq. (3.5)}$$

$$\varphi^{neq}(x, t) = \sum_i \varepsilon_i (f_i(x, t) q_i(x, t) - f_i^{eq}(x, t) q_i^{eq}(x, t)) \qquad \text{Eq. (3.6)}$$

where $\pi^{neq}(x, t)$ is the non-equilibrium contribution to the momentum flux; $\varphi^{neq}(x, t)$ is the non-equilibrium contribution to the scalar flux.

The lattice sets used for LBM have a finite number of lattice directions and thus support a finite number of moments, known as an "order" of the lattice. Due to this limitation of the lattice set, the BGK collision that involves all higher order moments of the non-equilibrium, results in low stability range.

A regularized collision operator, also known as filtered collision operator, as set out U.S. Pat. No. 9,576,087, which is incorporated by reference in its entirety, can be used to enhance the stability of LBM by computing only the necessary moments and relaxing them during the collision process. A form of the filtered collision operator can be expressed as:

$$\Omega_{fi} = \left(1 - \frac{1}{\tau}\right) w_i \frac{\mathcal{H}^2(\varepsilon_i)}{2} : \pi^{neq}(x, t) \qquad \text{Eq. (3.7)}$$

$$\Omega_{qi} = \left(1 - \frac{1}{\tau_q}\right) w_i \mathcal{H}(\varepsilon_i) \cdot \varphi^{neq}(x, t) \qquad \text{Eq. (3.8)}$$

where $\varepsilon_i$ is the non-dimensional velocity of $i^{th}$ lattice; i is an index number of lattice velocities in the set; x is the particular location within the volume; t is a particular point in time; H is the Hermite polynomial; $\pi^{neq}$ is the non-equilibrium contribution to the momentum flux; $\varphi^{neq}$ is the non-equilibrium contribution to the scalar flux; $\Omega_{fi}$ represents the collision of particles; $\Omega_{qi}$ represents the collision of scalar.

4. Galilean Invariance in Collision Operator

The filtered collision forms above are useful in applications involving relatively low fluid flow velocities (e.g., <0.3 Mach). From the basic principle of Galilean invariance, the distribution functions, both equilibrium and non-equilibrium distributions of a many-particle system should be a function of particle velocities relative to their local fluid velocity rather than any particular reference frame (for instance, the reference frame of the lattice at rest). Indeed, it can be shown that the infinite Hermite expanded equilibrium distribution function admits a compact and Galilean invariant form similar to the Maxwell-Boltzmann distribution, as in Eq. (4.1).

$$f_i^{eq} = \rho w_i e^{\frac{\varepsilon_i^2}{2}} e^{\frac{-(\varepsilon_i-u)^2}{2}} \qquad \text{Eq. (4.1)}$$

where i is an index number of lattice velocities in the set; $\varepsilon_i$ is the non-dimensional lattice velocity; $\rho$ is the density of flow; $w_i$ is the lattice weight factor; u is the non-dimensional fluid velocity at any given location; and $f_i^{eq}$ is the equilibrium distribution of particles.

Eq.(4.1) is expressed in terms of $(\varepsilon_i-u)$, which is the particle velocity relative to the local fluid velocity. Clearly $\varepsilon_i$ is the particle velocity in the reference frame of the lattice at rest. Therefore, a similar compact Galilean invariant form for the non-equilibrium distribution function could be used. A first task for accomplishing the above is to redefine the proper hydrodynamic moments.

Instead of Eq.(3.5) and Eq.(3.6) that are defined in the particular absolute reference frame of lattice at rest, they need to be replaced by the corresponding ones in the relative reference frame in terms of the relative particle velocities, $$\tilde{\pi}^{neq} = \sum_i (\varepsilon_i - u)(\varepsilon_i - u)(f_i - f_i^{eq}) \qquad \text{Eq. (4.2)}$$

$$\tilde{\varphi}^{neq} = \sum_i (\varepsilon_i - u)(f_i q_i - f_i^{eq} q_i^{eq}) \qquad \text{Eq. (4.3)}$$

where i is an index number of lattice velocities in the set; $\varepsilon_i$ is the non-dimensional lattice velocity; $\pi^{neq}$ is the non-equilibrium contribution to the momentum flux; $\varphi^{neq}$ is the non-equilibrium contribution to the scalar flux; $f_i^{eq}$ is the equilibrium distribution of particles; $q_i^{eq}$ is the equilibrium distribution of scalar; $f_i$ is the actual particle distribution of the flow; $q_i$ is the actual amount of scalar distribution; u is the non-dimensional fluid velocity at any given location.

However, the non-equilibrium momentum flux and scalar flux in the reference frame is the same as that of non-equilibrium fluxes at rest due to the conservation of momentum and scalar concentration, i.e., $\tilde{\pi}^{neq} = \pi^{neq}$ and $\tilde{\varphi}^{neq} = \varphi^{neq}$.

It is desired, therefore, to obtain a proper Galilean invariant formulation of a non-equilibrium distribution. The full functional form of the equilibrium distribution is Galilean invariant, the goal is thus to tie the non-equilibrium distribution to its equilibrium counterpart.

Briefly discussed below is the basic concept of how the non-equilibrium distribution can be expressed as a function of the equilibrium distribution in the framework of fundamental physics of kinetic theory. The equilibrium and non-equilibrium distributions are intrinsically related to each other via the dynamics of the Boltzmann kinetic equation. The non-equilibrium distribution can, in principle, be expressed in terms of the equilibrium distribution function. Indeed, such an explicit functional form can either be expressed as an infinite series in powers of spatial and temporal derivatives via the so-called Chapman-Enskog expansion or as an exact compact form under some specific microscopic conditions. In U.S. Pat. No. 9,576,087 was proposed a new formulation for the non-equilibrium as a multiplication of equilibrium distribution by the non-equilibrium momentum flux, which is relevant in Navier-stokes fluid regime.

$$f^{neq} \approx f^{eq} \left[ \varepsilon' \varepsilon' - \frac{(\varepsilon')^2}{D} I \right] : \frac{\pi^{neq}}{\rho} \qquad \text{Eq. (4.4)}$$

where $\varepsilon' = (\varepsilon - u)$ is the relative velocity; $\pi^{neq}$ is the non-equilibrium contribution to the momentum flux; $f^{eq}$ is equilibrium distribution of particles; $f^{neq}$ is non equilibrium of the particles; D is the dimension of the system; and $\rho$ is the density of flow;

By comparing the terms, a final compact form is obtained as:

$$f_i^{neq} = f_i^{eq} \left[ \frac{\varepsilon_i' \varepsilon_i' - I}{2} \right] : \frac{\pi^{neq}}{\rho} \qquad \text{Eq. (4.5)}$$

where i is an index number of lattice velocities in the set, $\varepsilon' = (\varepsilon_i - u)$ is the relative velocity, $\pi^{neq}$ is the non-equilibrium contribution to the momentum flux, $f_i^{eq}$ is the equilibrium distribution of particles, and $\rho$ is the density of fluid.

The fully Galilean invariant form of the equilibrium distribution Eq.(1.3) and the non-equilibrium distribution Eq.(4.5) are feasible to use if the supporting lattice velocity set has infinite order of isotropy. For any given lattice with finite order of accuracy, these functions are truncated. After some derivation, the following expression is obtained for any given lattice with finite order of isotropy, $$f_i^{neq} = \frac{w_i}{2} \sum_{n=2}^{N} \frac{\mathcal{H}^n(\varepsilon_i)}{(n-2)!} u^{n-2} : \pi^{neq} \qquad \text{Eq. (4.6)}$$

where $w_i$ is the lattice weight factor, u is the non-dimensional fluid velocity, $\mathcal{H}$ is the Hermite polynomial, $\pi^{neq}$ is the non-equilibrium contribution to the momentum flux, and $f_i^{neq}$ is non-equilibrium distribution of particles for $i^{th}$ lattice.

The zeroth order of the above form, i.e., n=2, will recover the regularized collision operator. The first and second orders of Eq.(4.6) are given explicitly as $$f_i^{neq} = \frac{w_i}{2} \{(1 + \varepsilon_i \cdot u)[(\varepsilon_i \varepsilon_i - I) : \pi^{neq}] - (\varepsilon_i u + u\varepsilon_i) : \pi^{neq}\} \qquad \text{Eq. (4.7)}$$

$$f_i^{neq} = \frac{w_i}{2} \left\{ \left(1 + \varepsilon_i \cdot u + \frac{(\varepsilon_i \varepsilon_i - I)}{2} : uu \right) [(\varepsilon_i \varepsilon_i - I) : \pi^{neq}] - (1 + \varepsilon_i \cdot u)(\varepsilon_i u + u\varepsilon_i) : \pi^{neq} + uu : \pi^{neq} \right\} \qquad \text{Eq. (4.8)}$$

5. Extension to the Scalar Solver

The Galilean invariant filtered collision for flow solver extends the stability of a flow collision solver, and makes it feasible to simulate transonic and supersonic applications.

Similar to the flow solver 34c, the scalar solver 34c' is Galilean invariant as the underlying governing equation satisfies Galilean invariance requirements. Similar to the theory, the non-equilibrium scalar flux can be expressed in terms of its equilibrium distribution and relative velocity and relevant moments. For normal flows in the macroscopic regime, only first order moment proportional to the gradient of the scalar is relevant. An approximate non-equilibrium form as an infinite series can be given as:

$$(fq)^{neq} \approx (fq)^{eq}\varepsilon' \cdot \frac{\varphi^{neq}}{\rho q} \qquad \text{Eq. (5.1)}$$

where $\varepsilon'=(\varepsilon-u)$ is the relative velocity, $\varphi^{neq}$ is the non-equilibrium contribution to the scalar flux, $(fq)^{eq}$ is equilibrium distribution of total scalar, and $(fq)^{neq}$ is non equilibrium of the total scalar.

For a given lattice set with finite number of lattice, the above equation is rewritten in compact form as $$(fq)_i^{neq} = \frac{f_i^{eq}}{\rho}(\varepsilon_i' \cdot \varphi^{neq}) \qquad \text{Eq. (5.2)}$$

where i is an index number of lattice velocities in the set, $\varepsilon'_i=(\varepsilon_i-u)$ is the relative velocity of the flow, $f_i^{eq}$ is equilibrium distribution of particles for $i^{th}$ lattice, $(fq)_i^{neq}$ is non equilibrium of the total scalar, and $\varphi^{neq}$ is the non-equilibrium contribution to the scalar flux.

Similar to the flow distribution, due to limitation of order of isotropy, the above form is not realizable in its actual form. For a given lattice with finite order of isotropy, the above equation is truncated and following final form is obtained after some derivation, as in Eq.(5.3).

$$(fq)_i^{neq} = w_i \sum_{n=1}^{N} \frac{\mathcal{H}^n(\varepsilon_i)}{(n-1)!} u^{n-1} : \varphi^{neq} \qquad \text{Eq. (5.3)}$$

where $w_i$ is the weight factor, u is the non-dimensional fluid velocity, $\mathcal{H}$ is the Hermite polynomial, $(fq)_i^{neq}$ is non equilibrium of the total scalar, and $\varphi^{neq}$ is the non-equilibrium contribution to the scalar flux.

The zeroth order form (i.e.,) n=1 of above expression will recover filtered (regularized) collision operator. The first and second order forms of the Eq.(5.3) in explicit terms are given by:

$$(fq)_i^{neq} = w_i\{(1+\varepsilon_i \cdot u)(\varepsilon_i \cdot \varphi^{neq}) - (u \cdot \varphi^{neq})\} \qquad \text{Eq. (5.5)}$$

$$(fq)_i^{neq} = w_i\left\{\left(1+\varepsilon_i \cdot u + \frac{(\varepsilon_i\varepsilon_i - I)}{2}:uu\right)(\varepsilon_i \cdot \varphi^{neq}) - (1+\varepsilon_i \cdot u)(u \cdot \varphi^{neq})\right\}$$

Referring to FIGS. 5 and 6, a process flow 60 for a flow solver 34c and a process flow 70 for one or more scalar solvers 34c' are shown.

Starting with FIG. 5, the flow solver process 60 provides 62 a lattice velocity set that supports necessary hydrodynamic moments up to a specified order, the process 60 simulates 64 in the lattice velocity set, movement of particles in a volume of fluid, and determines 66 a deviation(s) of particle distribution from an equilibrium value, that is non-equilibrium momentum flux of the particles. From the determination of deviation(s) of particle distribution, the process determines 68 Galilean invariant post-collide distribution functions as a function of non-equilibrium flux and particle equilibrium distributions. Details of the flow solver process are described in the above U.S. Pat. No. 9,576,087.

Referring to FIG. 6, a process 70 for scalar(s) solver is shown. The process 70 provides 72 additional lattice velocity set(s) that support necessary moments for additional scalar(s), e. g., an additional lattice velocity set per scalar. The process 70 simulates 74 with the additional lattice velocity set, movement of scalar(s) functions carried by flow particles and determines 76 any deviation(s) of the scalar function from its/their respective average value(s), that is non-equilibrium contribution flux of the scalar(s). The process 70 for the scalar(s) solver determines 78 Galilean invariant post-collide distribution functions for scalar(s) as a function of non-equilibrium flux and scalar(s) equilibrium values.

A general discussion of an LBM-based simulation system is provided below including the scalar solver process 70 to conduct fluid flow simulations.

Figure 7:
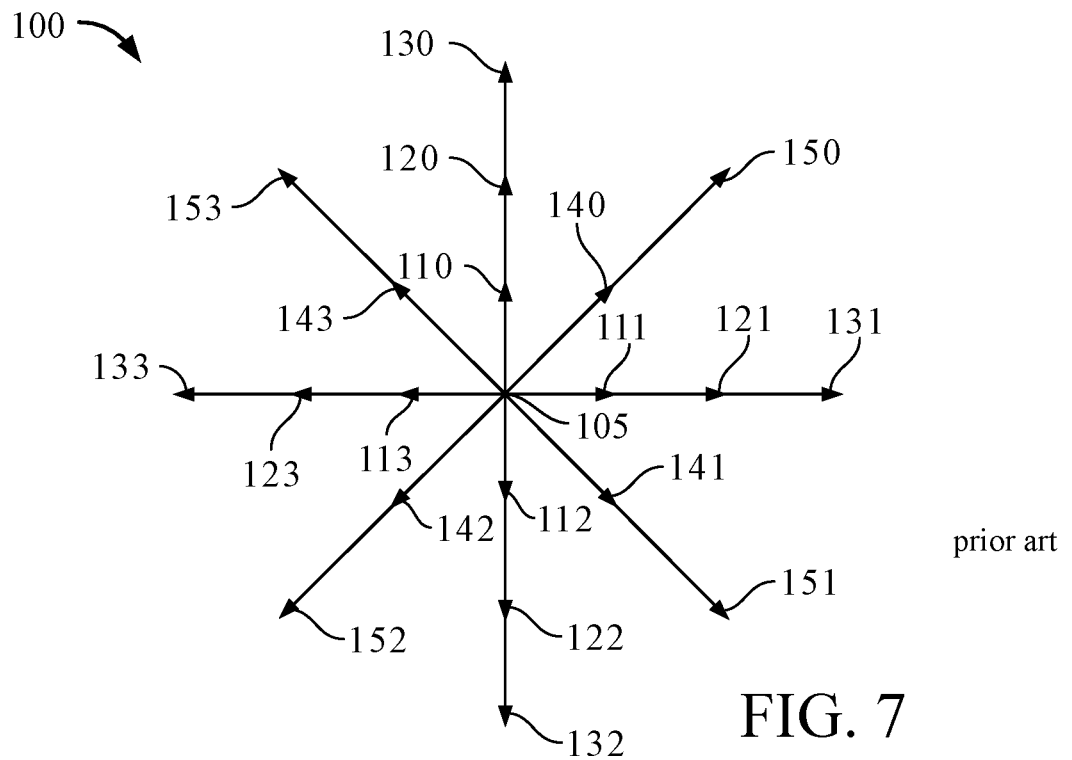
FIGS. 7 and 8 illustrate velocity components of two LBM models (prior art).

Referring to FIG. 7, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 8:
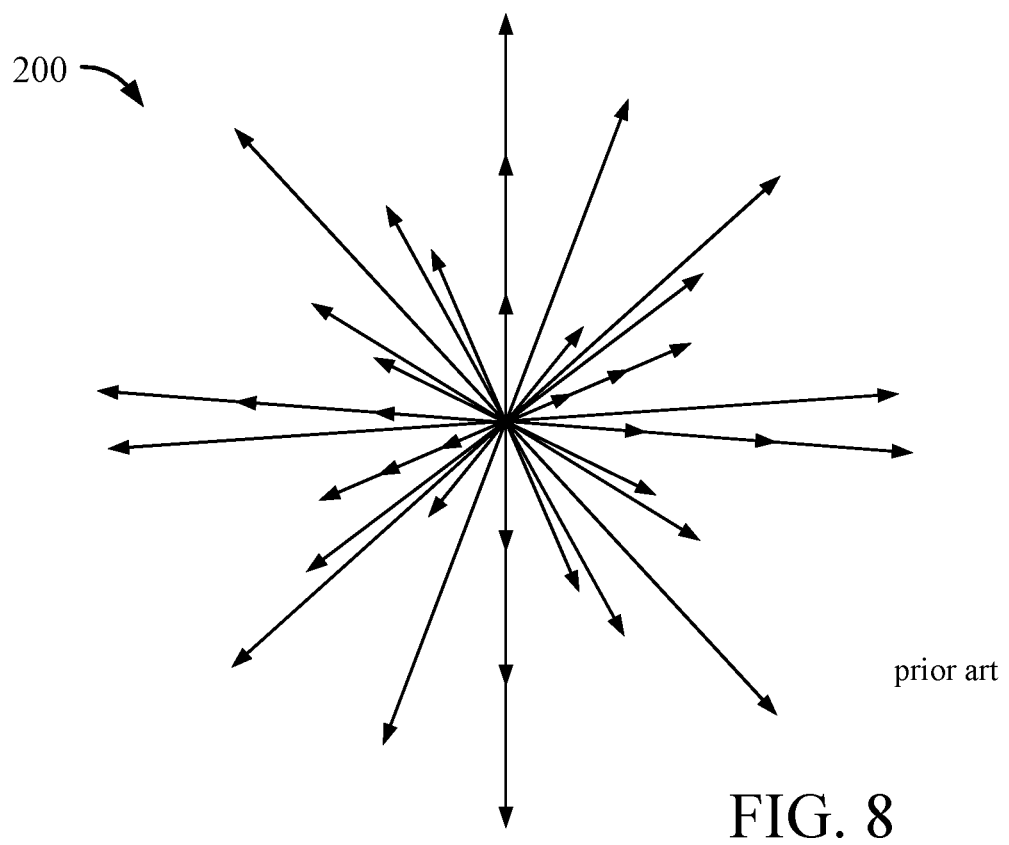

As also illustrated in FIG. 8, a second model (3D-1) 200 is a three-dimensional model that includes 39 velocities, where each velocity is represented by one of the arrowheads of FIG. 8. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model, include 101 velocities and a 2D-2 model includes 37 velocities also may be used. The velocities are more clearly described by their components along each axis as documented in Tables 1 and 2 respectively.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space, which facilitates accurate and efficient implementation of discrete velocity models, particularly the kind known as the lattice Boltzmann models. Using such models, flows can be simulated with high fidelity.

A. Example

Figure 9:
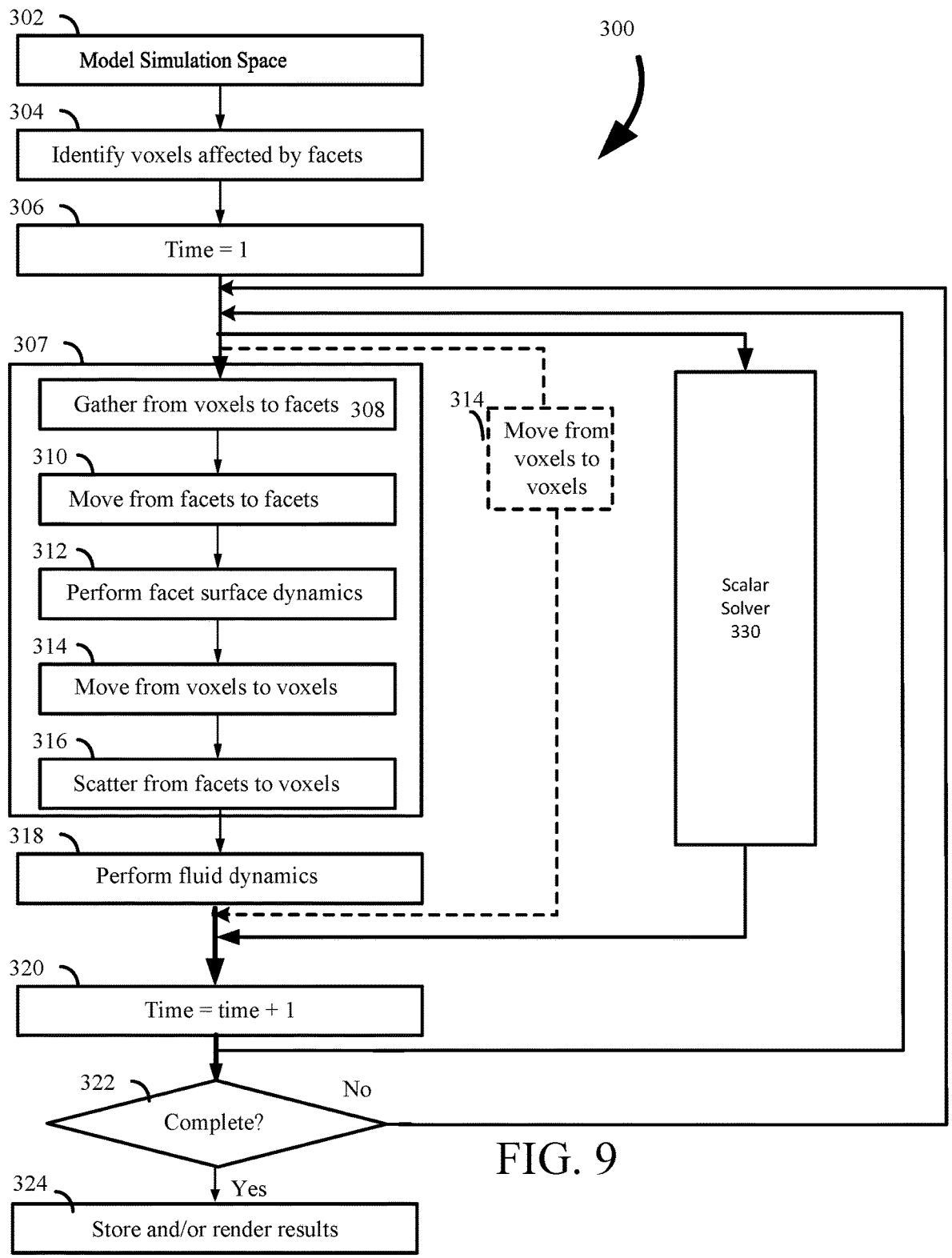
FIG. 9 is a flow chart of a procedure followed by a physical process simulation system.

Referring to FIG. 9, a physical process simulation system operates according to a procedure 300 to simulate a physical process such as fluid flow. Prior to the simulation, a simulation space is modeled as a collection of voxels (302). Typically, the simulation space is generated using a computer-aided-design (CAD) program. For example, a CAD program could be used to draw the airfoil positioned in a wind tunnel. Thereafter, data produced by the CAD program is processed to add a lattice structure having appropriate resolution and to account for the airfoil and surfaces of the airfoil within the simulation space. As mentioned above any physical shaped device could be the subject of the fluid flow simulation and scalar properties can be evaluated of the physical shaped device, using the scalar solver.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v. \quad \text{Eq.(I-2)}$$

The characteristic length of an object represents large-scale features of the object. For example, if a flow around a micro-device were being simulated, the height of the micro-device might be considered to be the characteristic length. When a flow is around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x, t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i=(c_{i,x},c_{i,y},c_{i,z}) \quad \text{Eq.(I-3)}$$

The energy level zero state represents stopped particles that are not moving in any dimension, i.e. $c_{stopped}=(0, 0, 0)$. Energy level one states represent particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

B. Microblock

Figure 10:
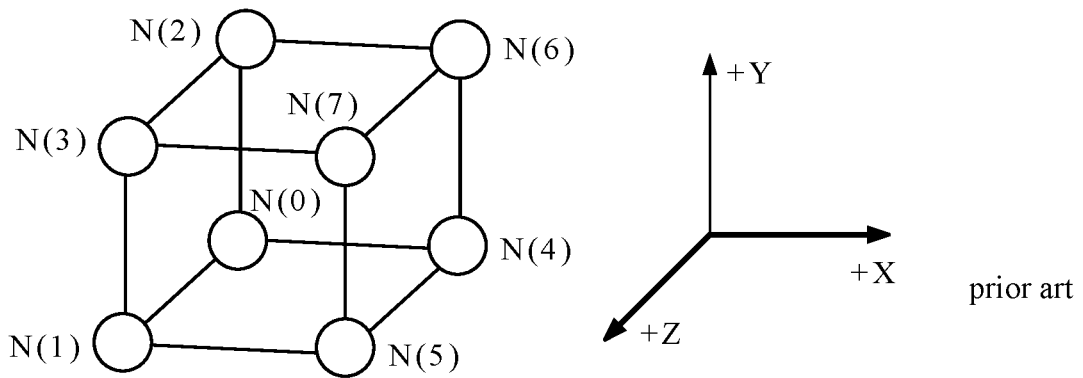
FIG. 10 is a perspective view of a microblock (prior art).

Referring now to FIG. 10, a microblock is illustrated. For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$.

Figure 11A:
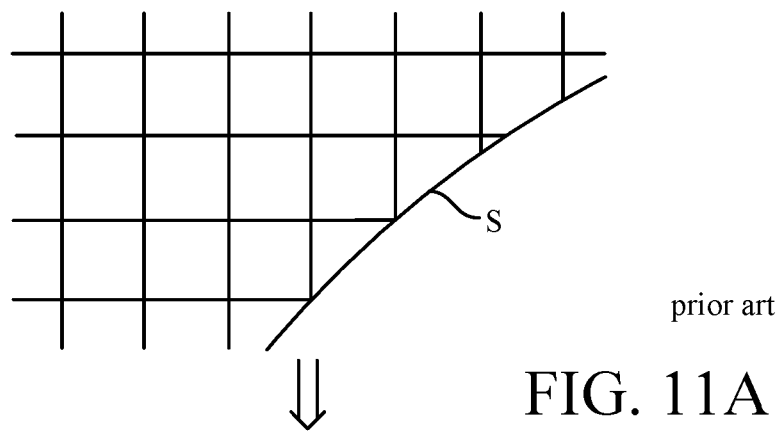
FIGS. 11A and 11B are illustrations of lattice structures (prior art).
Figure 11B:
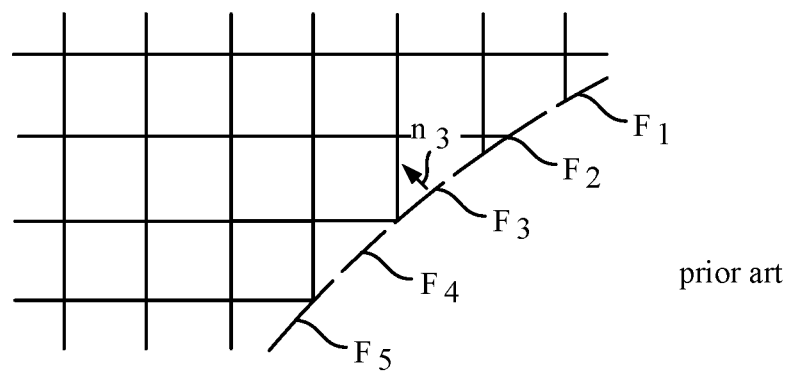

Referring to FIGS. 11A and 11B, a surface S (FIG. 11A) is represented in the simulation space (FIG. 11B) as a collection of facets $F_\alpha$:

$$S=\{F_\alpha\} \quad \text{Eq. (I-4)}$$

where α is an index that enumerates a particular facet. A facet is not restricted to the voxel boundaries, but is typically sized on the order of, or slightly smaller than, the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 12:
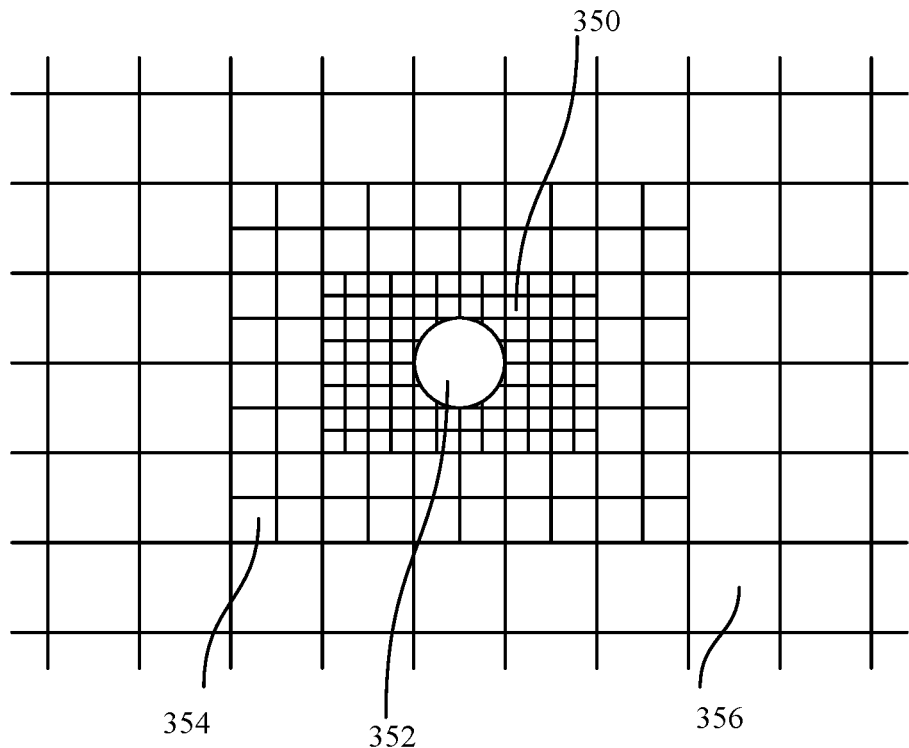
FIGS. 12 and 13 illustrate variable resolution techniques (prior art).

Referring to FIG. 12, different levels of resolution may be used in different regions of the simulation space to improve processing efficiency. Typically, the region 350 around an object 352 is of the most interest and is therefore simulated with the highest resolution. Because the effect of viscosity decreases with distance from the object, decreasing levels of resolution (i.e., expanded voxel volumes) are employed to simulate regions 354, 356 that are spaced at increasing distances from the object 352.

Figure 13:
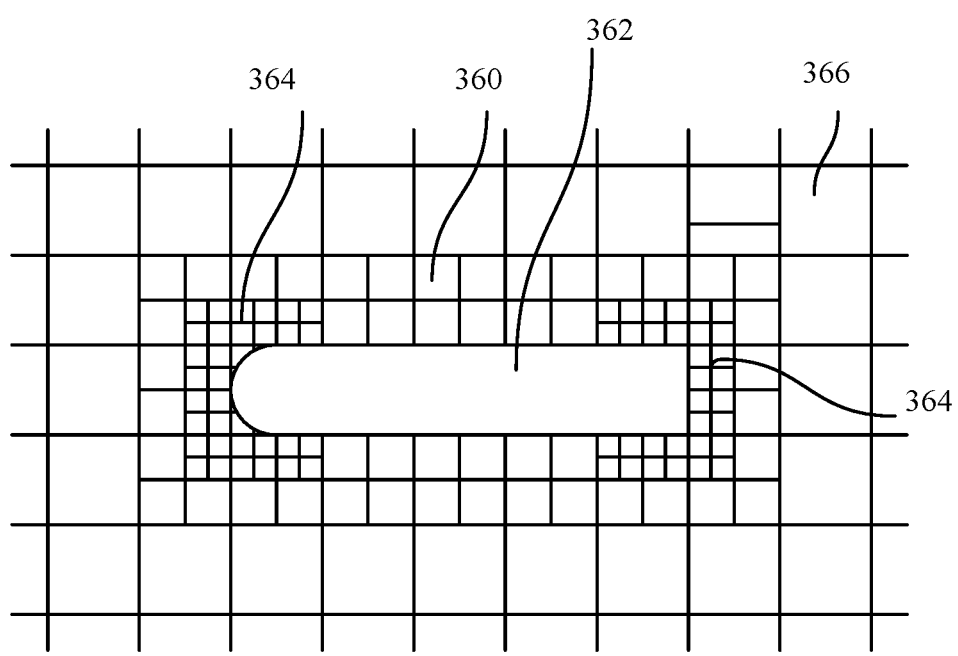

Similarly, as illustrated in FIG. 13, a lower level of resolution may be used to simulate a region 360 around less significant features of an object 362 while the highest level of resolution is used to simulate regions 364 around the most significant features (e.g., the leading and trailing surfaces) of the object 362. Outlying regions 366 are simulated using the lowest level of resolution and the largest voxels.

C. Identify Voxels Affected by Facets

Referring again to FIG. 9, once the simulation space has been modeled (302), voxels affected by one or more facets are identified (304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid, or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 14:
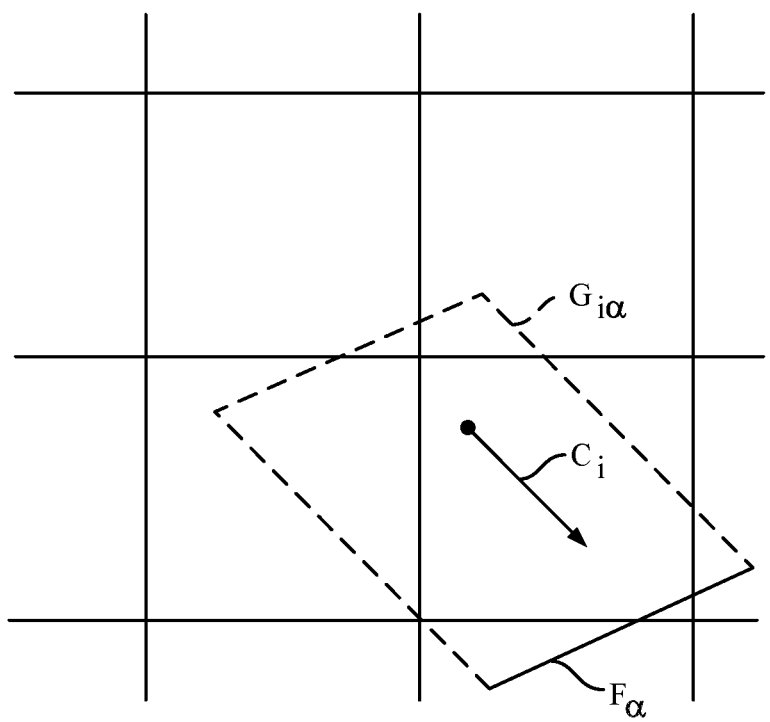
FIG. 14 illustrates regions affected by a facet of a surface (prior art).

Referring to FIG. 14, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha}=|c_i n_\alpha|A_\alpha \qquad \text{Eq.(I-5)}$$

The facet $F_\alpha$ receives particles from the volume $V_{i\alpha}$ when the velocity vector of the state is directed toward the facet ($|c_i n_i|<0$), and transfers particles to the region when the velocity vector of the state is directed away from the facet ($|c_i n_i|>0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of, or smaller than, the size of the voxels located near the facet.

The portion of a voxel $N(x)$ overlapped by a parallelepiped $G_{i\alpha}$ is defined as $V_{i\alpha}(x)$. Using this term, the flux $\Gamma_{i\alpha}(x)$ of state i particles that move between a voxel $N(x)$ and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x)=N_i(x)+V_{i\alpha}(x). \qquad \text{Eq.(I-6)}$$

When the parallelepiped $G_{i\alpha}$ is intersected by one or more facets, the following condition is true:

$$V_{i\alpha}=\Sigma V_{i\alpha}(x)+\Sigma V_{i\alpha}(\beta) \qquad \text{Eq.(I-7)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha}=\Sigma V_{i\alpha}(x). \qquad \text{Eq.(I-8)}$$

D. Perform Simulation

Once the voxels that are affected by one or more facets are identified (step 304), a timer is initialized to begin the simulation (step 306). During each time increment of the simulation, a set of elements 307 are executed that includes movement of particles from voxel to voxel simulated by an advection stage (308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324). Also shown is a scalar solver process 330 that implements the features discussed above. The scalar process 330 includes an instantiation of the elements 307, but instantiated and executed using the additional lattice velocity set(s) that support the necessary moments for the additional scalar(s), as discussed above.

1. Boundary Conditions for Surface

To correctly simulate interactions with a surface, each facet should meet four boundary conditions. First, the combined mass of particles received by a facet should equal the combined mass of particles transferred by the facet (i.e., the net mass flux to the facet should equal zero). Second, the combined energy of particles received by a facet should equal the combined energy of particles transferred by the facet (i.e., the net energy flux to the facet should equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux should equal zero and the net normal momentum flux should equal the local pressure at the facet. Thus, the components of the combined received and transferred momentums that are perpendicular to the normal $n_\alpha$ of the facet (i.e., the tangential components) should be equal, while the difference between the components of the combined received and transferred momentums that are parallel to the normal $n_\alpha$ of the facet (i.e., the normal components) should equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first in simulating interaction between particles and a surface, particles are gathered from the voxels and provided to the facets (308). As noted above, the flux of state i particles between a voxel N(x) and a facet $F_\alpha$ is:

$$\Gamma_{i\alpha}(x)=N_i(x)V_{i\alpha}(x).\qquad\text{Eq.(I-9)}$$

From this, for each state i directed toward a facet $F_\alpha(c_i n_\alpha<0)$, the number of particles provided to the facet $F_\alpha$ by the voxels is:

$$\Gamma_{i\alpha V\to F}=\Sigma_X\Gamma_{i\alpha}(x)=\Sigma_X N_i(x)V_{i\alpha}(x)\qquad\text{Eq.(I-10)}$$

Only voxels for which $V_{i\alpha}(x)$ has a non-zero value should be summed. As noted above, the size of the facets is selected so that $V_{i\alpha}(x)$ has a non-zero value for only a small number of voxels. Because $V_{i\alpha}(x)$ and $P_f(X)$ may have non-integer values, $\Gamma_\alpha(x)$ is stored and processed as a real number.

3. Move from Facet to Facet

Next, particles are moved between facets (310). If the parallelepiped $G_{i\alpha}$ for an incoming state ($c_i n_\alpha<0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment.

Figure 16:
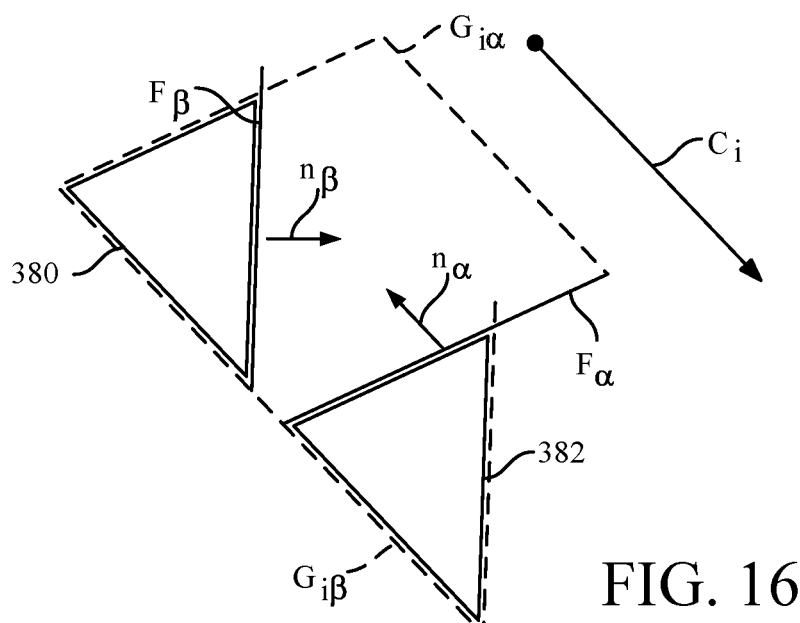
FIG. 16 illustrates movement of particles from a surface to a surface.

Referring now to FIG. 16 where a relationship of the state i particles produced by facet $F_\beta$ during the previous time increment is illustrated. In FIG. 16, it is shown that a portion 380 of the parallelepiped $G_{i\alpha}$ that is intersected by facet $F_\beta$ equals a portion 382 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta,t-1)=\Gamma_i(\beta)V_{i\alpha}(\beta)/V_{i\alpha}\qquad\text{Eq.(I-11)}$$

where $\Gamma_i(\beta, t-1)$ is a measure of the state i particles produced by the facet $F_\beta$ during the previous time increment. From this, for each state i directed toward a facet $F_\alpha(c_i n_\alpha<0)$, the number of particles provided to the facet $F_\alpha$ by the other facets is:

$$\Gamma_{i\alpha F\to F}=\Sigma_\beta\Gamma_{i\alpha}(\beta)=\Sigma_\beta\Gamma_i(\beta,t-1)V_{i\alpha}(\beta)/V_{i\alpha}\qquad\text{Eq.(I-12)}$$

and the total flux of state i particles into the facet is:

$$\Gamma_{iIN}(\alpha)=\Gamma_{i\alpha F\to F}+\Gamma_{i\alpha F\to F}=\Sigma_X N_i(x)V_{i\alpha}+\Sigma_\beta\Gamma_i(\beta,t-1)V_{i\alpha}(\beta)/V_{i\alpha}\qquad\text{Eq.(I-13)}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha)=\Gamma_{iIN}(\alpha)/V_{i\alpha}\qquad\text{Eq.(I-14)}$$

for $c_i n_\alpha<0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha)=\Gamma_{iOTHER}(\alpha)/V_{i\alpha}\qquad\text{Eq.(I-15)}$$

for $c_i n_\alpha\geq 0$, wherein $\Gamma_{iOTHER}(\alpha)$ is determined using the technique described above for generating $\Gamma_{iIN}(\alpha)$, but applying the technique to states ($c_i n_\alpha\geq 0$) other than incoming states ($c_i n_\alpha<0$)). In an alternative approach, $\Gamma_{iOTHER}(\alpha)$ may be generated using values of $\Gamma_{iOUT}(\alpha)$ from the previous time so that:

$$\Gamma_{iOTHER}(\alpha,t)=\Gamma_{iOUT}(\alpha,t-1).\qquad\text{Eq.(I-16)}$$

For parallel states ($c_i n_\alpha=0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, -2)) are initialized at the beginning of the simulation based on initial conditions for temperature and pressure. These values are then adjusted over time.

4. Perform Facet Surface Dynamics

Figure 17:
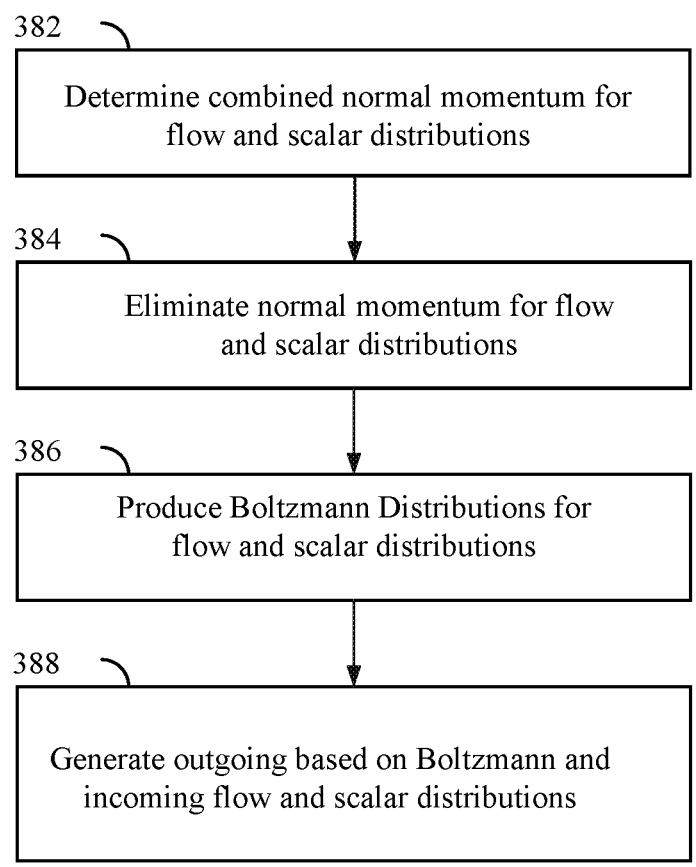
FIG. 17 is a flow chart of a procedure for performing surface dynamics.

Next, surface dynamics are performed for each facet to satisfy the four boundary conditions discussed above (312). A procedure for performing surface dynamics for a facet is illustrated in FIG. 17. This procedure is performed for flow particles and for scalar particles, as shown. Initially, the combined momentum normal to the facet $F_\alpha$ is determined (382) by determining the combined momentum $P(\alpha)$ of the particles at the facet as:

$$P(\alpha)=\Sigma_i c_i^* N_i^\alpha\qquad\text{Eq.(I-17)}$$

for all i. From this, the normal momentum $P_n(\alpha)$ is determined as:

$$P_n(\alpha)=n_\alpha\cdot P(\alpha).\qquad\text{Eq.(I-18)}$$

This normal momentum is eliminated using a pushing/pulling technique (384) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (386). As described below with respect to performing fluid dynamics, a Boltzmann distribution may be achieved by applying a set of collision rules to $N_{n-}(\alpha)$ to each of flow and scalar distributions.

An outgoing flux distribution for the facet $F_\alpha$ is determined (388) based on the incoming flux distribution and Boltzmann Distribution.

First, the difference between the incoming flux distribution $\Gamma_i(\alpha)$ and the Boltzmann distribution is determined as:

$$\Delta\Gamma_i(\alpha)=\Gamma_{iIN}(\alpha)-N_{n-\beta i}(\alpha)V_{i\alpha}\qquad\text{Eq.(I-19)}$$

Using this difference, the outgoing flux distribution is:

$$\Gamma_{iOUT}(\alpha)=N_{n-\beta i}(\alpha)V_{i\alpha}-\Delta\Gamma_{i^*}(\alpha),\qquad\text{Eq.(I-20)}$$

for $n_\alpha c_i>0$ and where i* is the state having a direction opposite to state i. For example, if state i is (1, 1, 0, 0), then state i* is (-1, -1, 0, 0). To account for skin friction and other factors, the outgoing flux distribution may be further refined to:

$$\Gamma_{iOUT}(\alpha)=N_{n-Bi}(\alpha)V_{i\alpha}-\Delta\Gamma_{i^*}(\alpha)+C_f(n_\alpha\cdot c_i)-[N_{n-\beta i}^*(\alpha)-N_{n-\beta i}(\alpha)]V_{i\alpha}+(n_\alpha\cdot c_i)(t_{1\alpha}\cdot c_i)\Delta N_{j,1}V_{i\alpha}+(n_\alpha\cdot c_i)(t_{2\alpha}\cdot c_i)\Delta N_{j,2}V_{i\alpha}\qquad\text{Eq.(I-21)}$$

for $n_\alpha c_i>0$, where $C_f$ is a function of skin friction, $t_{i\alpha}$ is a first tangential vector that is perpendicular to $n_\alpha$, $t_{2\alpha}$ is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \sum_i c_i c_i N_{n-Bi}(\alpha) \cdot t_{1,2\alpha}\right) \quad \text{Eq. (I-22)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho, \quad \text{Eq.(I-23)}$$

where $\rho$ is the density of the facet distribution:

$$\rho = \sum_i N_i(\alpha) \quad \text{Eq. (I-24)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha)V_{i\alpha}. \quad \text{Eq.(I-25)}$$

The outgoing flux distribution then becomes:

$$\Gamma_{iOUT}(\alpha) = N_{n-\beta i}(\alpha)V_{i\alpha} - \Delta\Gamma_i^*(\alpha) + C_f(n_\alpha c_i)[N_{n-\beta i^*}(\alpha) - N_{n-\beta i}(\alpha)]V_{i\alpha}, \quad \text{Eq.(I-26)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = \rho_\alpha n_\alpha A_\alpha - C_i \rho_\alpha u_i A_\alpha \quad \text{Eq. (I-27)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha m j} = \sum_{i,c_{ji} \cdot n_\alpha < 0} \Gamma_{\alpha j i IN} - \sum_{i,c_{ji} \cdot n_\alpha > 0} \Gamma_{\alpha j i OUT} \quad \text{Eq. (I-28)}$$

where the index j denotes the energy of the state i. This energy difference is then used to generate a difference term:

$$\Delta\Gamma_{\alpha j i} = V_{i\alpha}\Delta\Gamma_{\alpha m j}, \sum_{i,c_{ji} \cdot n_\alpha < 0} V_{i\alpha} \quad \text{Eq. (I-29)}$$

for $c_{ji} n_\alpha > 0$. This difference term is used to modify the outgoing flux so that the flux becomes:

$$\Gamma_{\alpha j i OUT f} = \Gamma_{\alpha j i OUT} + \delta\Gamma_{\alpha j i} \quad \text{Eq.(I-30)}$$

for $c_{ji} n_\alpha > 0$. This operation corrects the mass and energy flux while leaving the tangential momentum flux unaltered. This adjustment is small if the flows (fluid and scalar) is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 9, particles are moved between voxels along the three-dimensional rectilinear lattice (314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Figure 15:
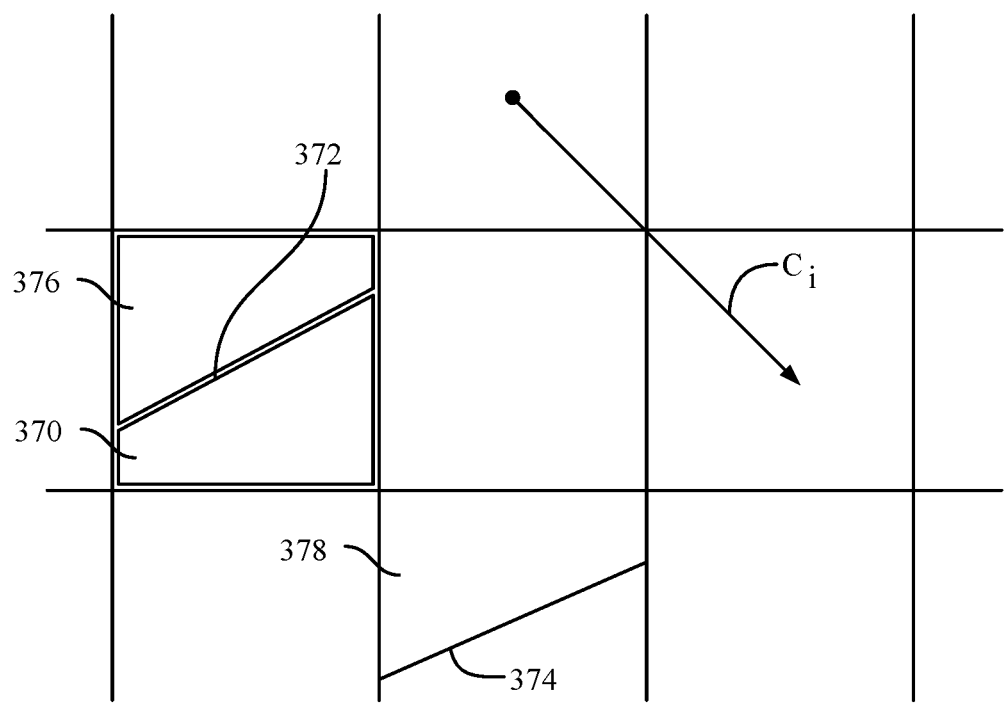
FIG. 15 illustrates movement of particles from a voxel to a surface.

Referring to FIG. 15, when a portion 370 of the state i particles for a voxel 372 is moved to a facet 374 (278), the remaining portion 376 is moved to a voxel 378 in which the facet 374 is located and from which particles of state i are directed to the facet 374. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \quad \text{Eq. (I-31)}$$

where N(x) is the source voxel.

6. Scatter from Facets to Voxels

Next, the outgoing particles from each facet are scattered to the voxels (316). Essentially, this is the reverse of the gather by which particles were moved from the voxels to the facets. The number of state i particles that move from a facet $F_\alpha$ to a voxel $N(x)$ is:

$$N_{\alpha iF \to V} = \frac{1}{P_f(x)} V_{i\alpha}(x) \Gamma_{\alpha iOUT_f} / V_{\alpha i} \quad \text{Eq. (I-32)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha iOUT_f} / V_{\alpha i} \quad \text{Eq. (I-33)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum, and energy after these quantities are truncated to fit in the allowed range of values.

To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (318). This may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Eq. I-1 and Eq. I-2 above. After the advection step, the conserved quantities of a fluid system, specifically the density, momentum, and the energy are obtained from the distribution function using Eq. I-3. From these quantities, the equilibrium distribution function, noted by $f^{eq}$ in equation (2), is fully specified by Eq.-4. The choice of the velocity vector set $c_i$, the weights, both are listed in Table 1, together with Eq. I-2 ensures that the macroscopic behavior obeys the correct hydrodynamic equation.

E. Variable Resolution

Variable resolution (as discussed in U.S. 2013/0151221 A1) can also be employed and would use voxels of different sizes, e.g., coarse voxels and fine voxels, and can be applied to both flow and scalar particle interactions with voxels.

By leveraging the unique transient Lattice Boltzmann-based physics, the system can perform simulations that accurately predict real-world conditions. For example, engineers evaluate product performance early in the design process before any prototype being built, when the impact of the change is most significant for design and budgets. The system can use the CAD geometry to accurately and efficiently perform aerodynamic, aero-acoustic and thermal management simulations.

With the scalar solvers, the system can perform simulations to address high Mach Number applications as application involving Mach numbers greater than 0.3 or greater than 1.0 or greater than multiples of 1.0. Such applications can be found in aerodynamics (aerodynamic efficiency; vehicle handling; soiling and water management; panel deformation; driving dynamics), aeroacoustics (greenhouse wind noise; underbody wind noise; gap/seal noise; mirror, whistle and tonal noise; sunroof and window buffeting; pass-by/community noise; cooling fan noise), thermal management (cooling airflow; thermal protection; brake cooling; drive cycle simulation; key-off and soak; electronics and battery cooling; ROA/intake ports), climate control (cabin comfort; HVAC unit & distribution system performance; HVAC system and fan noise; defrost and demist), powertrain: (drivetrain cooling; exhaust systems; cooling jacket; engine block), soiling and water management (a pillar overflow, dirt and dust accumulation, tire spray).

Embodiments of the subject matter and the functional operations described in this specification can be implemented in digital electronic circuitry, tangibly embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data including, by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile memory on media and memory devices including, by way of example, semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer implemented method for simulating fluid flow about a physical object and concurrently solving for a scalar quantity, the method comprising:

reading from memory, by a computer system, a computer-aided design (CAD) model of a simulation space including a CAD model of the physical object in the simulation space;

reading from memory a lattice structure added to the CAD model of the simulation space by the computer system, the lattice structure having appropriate resolutions to account for surfaces of the physical object in the simulation space, the lattice structure defines dimensions of voxels;

storing in memory, by the computer system, simulation results from a flow solver of the computer system, the flow solver having simulated using a flow lattice velocity set, movement of flow particles from the voxels defined by the lattice structure to a first set of other voxels defined by the lattice structure, the movement of the flow particles representing a volume of fluid, with the movement of the flow particles causing collisions among the flow particles, and the flow solver having evaluated a non-equilibrium post-collide flow distribution function of a specified order that is representative of the collisions among the flow particles;

storing in memory, by the computing system, simulation results from a scalar solver of the computer system, the scalar solver having simulated, using a scalar lattice velocity set different than the flow lattice velocity set, movement of scalar particles from the voxels defined by the lattice structure to a second set of other voxels defined by the lattice structure, the movement of the scalar particles representing a scalar quantity in the volume of fluid in the simulation space, with the scalar particles carried by the flow particles of the volume of fluid over the lattice structure, and with the movement of the scalar particles causing scalar collisions among the scalar particles, and the scalar solver having evaluated a non-equilibrium post-collide scalar distribution function of a specified order that is representative of the scalar collisions, with the non-equilibrium post-collide scalar distribution function being proportional to a summation over the scalar lattice velocity set of a Hermite polynomial divided by a factorial of the specified order that is representative of the scalar collisions times a non-dimensional velocity of the volume of the fluid; and rendering, by the computing system for display on a display device, one or more of the simulation results stored from the flow solver or the scalar solver, wherein the scalar solver is executed in parallel with the flow solver.

2. The method of claim 1 wherein the non-equilibrium post-collide scalar distribution function is Galilean invariant.

3. The method of claim 1 wherein the non-equilibrium post-collide scalar distribution function is related to relative velocity of the flow particles in the volume of fluid.

4. The method of claim 1 wherein the movement of the scalar particles causing collisions among the scalar particles results in a diffusion of scalar quantity through the volume of fluid.

5. The method of claim 1, wherein the scalar lattice velocity set, the scalar quantity and the non-equilibrium post-collide scalar distribution function are respectively a first scalar lattice velocity set, a first scalar quantity, and a first non-equilibrium post-collide scalar distribution function, and the method further comprises:

simulating, in the computer system using a second, different scalar lattice velocity set, movement of second scalar particles representing a second, different scalar quantity in the volume of fluid, with the second scalar particles carried by the flow particles in the volume of fluid, and with the movement of the second scalar particles causing collisions among the second scalar particles; and based on the movement of the second scalar particles;

evaluating, a second, different non-equilibrium post-collide scalar distribution function of a specified order that is representative of the second scalar collisions.

6. The method of claim 1 wherein the non-equilibrium post-collide scalar distribution function retains non-equilibrium moments for the scalar quantity, and eliminates non-equilibrium moments for the scalar quantity higher than the specified order that is representative of the scalar collisions.

7. The method of claim 1 wherein the scalar lattice velocity set supports hydrodynamic movements up to the specified order that is representative of the scalar collisions.

8. The method of claim 7 wherein the specified order that is representative of the scalar collisions is an exponential value associated with a ratio of the fluid velocity to lattice sound speed and the scalar lattice velocity set supports the exponential value.

9. The method of claim 7 wherein the specified order that is representative of the scalar collisions is selected from a zeroth order, a first order, and a second order.

10. The method of claim 1, further comprising:

determining, using the scalar lattice velocity set, relative particle velocities of the scalar particles at particular locations within the volume of fluid, with the relative particle velocities of the scalar particles being differences between absolute velocities of the scalar particles at the particular locations measured under zero flow of the fluid in the volume of fluid and a mean velocity of the scalar particles at the particular location within the volume of fluid; and determining, based on the relative particle velocities of the scalar particles, a non-equilibrium post-collide distribution of the specified order that is representative of the scalar collisions.

11. The method of claim 1 wherein for fluid flows of a macroscopic regime, the specified order is a first order moment proportional to a gradient of the scalar particles.

12. A computer system for simulating fluid flow about a physical object and concurrently solving for a scalar quantity, the system comprising:

one or more processors;

memory operatively coupled to the one or more processors; and a computer storage device that stores instructions to cause the one or more processors to:

read from the memory a computer-aided-design (CAD) model of a simulation space including a CAD model of the physical object in the simulation space;

read from the memory a lattice structure added to the CAD model of the simulation space, the lattice structure having appropriate resolutions to account for surfaces of the physical object in the simulation space, the lattice structure defines dimensions of voxels;

store in the memory simulation results from a flow solver of the computer system, the flow solver having simulated using a flow lattice velocity set, movement of flow particles from the voxels defined by the lattice structure to a first set of other voxels defined by the lattice structure, the movement of the flow particles representing a volume of fluid, with the movement of the flow particles causing collisions among the flow particles and the flow solver having evaluated a non-equilibrium post-collide flow distribution function of a specified order that is representative of the collisions among the flow particles; and store in the memory simulation results from a scalar solver of the computer system, the scalar solver having simulated using a scalar lattice velocity set different than the flow lattice velocity set, movement of scalar particles from the voxels defined by the lattice structure to a second set of other voxels defined by the lattice structure, the movement of the scalar particles representing a scalar quantity in the volume of fluid in the simulation space, with the scalar particles carried by the flow particles of the volume of fluid over the lattice structure, and with the movement of the scalar particles causing collisions among the scalar particles and the scalar solver having evaluated a non-equilibrium post-collide scalar distribution function of a specified order that is representative of the scalar collisions, with the non-equilibrium post-collide scalar distribution function being proportional to a summation over the scalar lattice velocity set of a Hermite polynomial divided by a factorial of the specified order that is representative of the scalar collisions times a non-dimensional velocity of the volume of the fluid; and render, for display on a display device, one or more of the simulation results stored from the flow solver or the scalar solver, wherein the scalar solver is executed in parallel with the flow.

13. The computer system of claim 12 wherein the non-equilibrium post-collide scalar distribution function is Galilean invariant.

14. The computer system of claim 12 wherein the non-equilibrium post-collide scalar distribution function is related to relative velocity of the flow particles in the volume of fluid.

15. The computer system of claim 12 wherein the movement of the scalar particles causing collisions among the scalar particles results in a diffusion of scalar quantity through the volume of fluid.

16. The computer system of claim 12 wherein the scalar lattice velocity set, the scalar quantity and the non-equilibrium post-collide scalar distribution function are respectively a first scalar lattice velocity set, a first scalar quantity, and a first non-equilibrium post-collide scalar distribution function, and the computer system further comprises instructions to:

simulate, in the computer system using a second, different scalar lattice velocity set, movement of second scalar particles representing a second, different scalar quantity in the volume of fluid, with the second scalar particles carried by the flow particles in the volume of fluid, and with the movement of the second scalar particles causing collisions among the second scalar particles; and based on the movement of the second scalar particles;

evaluate a second, different non-equilibrium post-collide scalar distribution function of a specified order that is representative of the second scalar collisions.

17. A computer program product for simulating fluid flow about a physical object and concurrently solving for a scalar quantity stored on a non-transitory computer readable medium including instructions for causing a system comprising one or more processors and memory storing a program to:

read from the memory a computer-aided-design (CAD) model of a simulation space including a CAD model of the physical object in the simulation space;

read from the memory a lattice structure added to the simulation space, the lattice structure having appropriate resolutions to account for surfaces of the physical object in the simulation space, the lattice structure defines dimensions of voxels;

store in the memory simulation results from a flow solver, the flow solver having simulated, using a flow lattice velocity set, movement of flow particles from the voxels defined by the lattice structure to a first set of other voxels defined by the lattice structure, the movement of the flow particles representing a volume of fluid, with the movement of the flow particles causing collisions among the flow particles and the flow solver having evaluated a non-equilibrium post-collide flow distribution function of a specified order that is representative of the collisions among the flow particles;

store in the memory simulation results from a scalar solver, the scalar solver having simulated, using a scalar lattice velocity set different than the flow lattice velocity set, movement of scalar particles from the voxels defined by the lattice structure to a second set of other voxels defined by the lattice structure, the movement of the scalar particles representing a scalar quantity in the volume of fluid in the simulation space, with the scalar particles carried by the flow particles of the volume of fluid over the lattice structure, and with the movement of the scalar particles causing scalar collisions among the scalar particles, and the scalar solver having evaluated a non-equilibrium post-collide scalar distribution function of a specified order that is representative of the scalar collisions, with the non-equilibrium post-collide scalar distribution function being proportional to a summation over the scalar lattice velocity set of a Hermite polynomial divided by a factorial of the specified order that is representative of the scalar collisions times a non-dimensional velocity of the volume of the fluid and render, for display on a display device, one or more of the simulation results stored from the flow solver or the scalar solver, wherein the scalar solver is executed in parallel with the flow solver.

18. The computer program product of claim 17 wherein the non-equilibrium post-collide scalar distribution function is Galilean invariant.

19. The computer program product of claim 17 wherein the non-equilibrium post-collide scalar distribution function is related to relative velocity of the flow particles in the volume of fluid.

20. The computer program product of claim 17 wherein the movement of the scalar particles causing collisions among the scalar particles results in a diffusion of scalar quantity through the volume of fluid.

21. The computer program product of claim 17 wherein the scalar lattice velocity set, the scalar quantity and the non-equilibrium post-collide scalar distribution function are respectively a first scalar lattice velocity set, a first scalar quantity, and a first non-equilibrium post-collide scalar distribution function, and the computer program product further comprises instructions to:

simulate, using a second, different scalar lattice velocity set, movement of second scalar particles representing a second, different scalar quantity in the volume of fluid, with the second scalar particles carried by the flow particles in the volume of fluid, and with the movement of the second scalar particles causing collisions among the second scalar particles; and based on the movement of the second scalar particles;

evaluate a second, different non-equilibrium post-collide scalar distribution function of a specified order that is representative of the second scalar collisions.

* * * * *